(12) United States Patent
Taguchi et al.

(10) Patent No.: US 7,418,546 B2
(45) Date of Patent: Aug. 26, 2008

(54) STORAGE RESOURCE MANAGEMENT METHOD FOR STORAGE SYSTEM

(75) Inventors: Yuichi Taguchi, Sagamihara (JP); Fumi Miyazaki, Kawasaki (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 11/259,958

(22) Filed: Oct. 26, 2005

(65) Prior Publication Data
US 2007/0033368 A1 Feb. 8, 2007

(30) Foreign Application Priority Data
Aug. 5, 2005 (JP) ............................. 2005-228246

(51) Int. Cl.
*G06F 12/00* (2006.01)
(52) U.S. Cl. .................. 711/112; 711/111; 711/114; 711/156; 711/158; 711/170; 711/221; 707/9; 707/205; 709/214; 709/221
(58) Field of Classification Search ................. 711/112, 711/111, 114, 156, 158, 170, 221; 707/9, 707/205; 709/214, 221
See application file for complete search history.

(56) References Cited

U.S. PATENT DOCUMENTS

| | | | |
|---|---|---|---|
| 6,275,898 B1 * | 8/2001 | DeKoning | 711/114 |
| 7,031,988 B2 * | 4/2006 | Kusama et al. | 707/205 |
| 7,305,462 B2 * | 12/2007 | Nakamura et al. | 709/223 |
| 2004/0078376 A1 | 4/2004 | Kusama et al. | |
| 2004/0260967 A1 * | 12/2004 | Guha et al. | 714/3 |
| 2006/0031631 A1 * | 2/2006 | Abe et al. | 711/112 |
| 2006/0053250 A1 * | 3/2006 | Saze | 711/114 |

FOREIGN PATENT DOCUMENTS

JP 2004-139494 5/2004

OTHER PUBLICATIONS

Terajima Atsushi, et al.. "Micro Patent MP Link," http://www.micropat.com, 2 pages, Japan, Aug. 9, 2005.

* cited by examiner

*Primary Examiner*—Stephen C Elmore
(74) *Attorney, Agent, or Firm*—Townsend and Townsend and Crew LLP

(57) ABSTRACT

Provided is a computer system including a storage subsystem, a host computer, and a management computer for managing the storage subsystem and the host computer. The storage subsystem manages a storage extent by a group unit and creates storage extent configuration information. The management computer stores group management information, obtains the storage extent configuration information, calculates an assigned capacity for each group based on the obtained storage extent configuration information, forecasts a capacity to be assigned in the future for each group based on the calculated assigned capacity, calculates a protection term expired capacity for each group based on the group management information and the storage extent configuration information, and outputs the assigned capacity, the capacity to be assigned in the future, and the protection term expired capacity. Thus, the storage extent of the storage subsystem can easily be managed.

18 Claims, 28 Drawing Sheets

| STORAGE EXTENT IDENTIFICATION INFORMATION | STORAGE CAPACITY | STORAGE EXTENT ATTRIBUTE INFORMATION | CREATION DATE | RETENTION TERM | COMPUTER IDENTIFICATION INFORMATION |
|---|---|---|---|---|---|
| 00:01 | 200GB | Read Only | 2004-03-31 | 10year | 20:01:10:00:AE:32:01:3B |
| 00:02 | 25GB | Read Only | 2004-04-30 | 10year | |
| ... | ... | ... | ... | ... | |
| 00:1B | 100GB | Read Only | 2004-10-31 | 3month | 20:01:10:00:C5:30:9F:02 |
| ... | ... | ... | ... | ... | |
| 00:41 | 30GB | Read Only | 2004-04-20 | n/a | 20:01:10:00:DB:A2:69:CD |
| ... | ... | ... | ... | ... | |
| 01:01 | 500GB | Normal | n/a | n/a | 20:01:10:00:0A:0B:C8:F2 |
| 01:02 | 400GB | Normal | n/a | n/a | |
| ... | ... | ... | ... | ... | |
| 02:01 | 20GB | Normal | n/a | n/a | n/a |
| 02:02 | 20GB | Normal | n/a | n/a | |
| ... | ... | ... | ... | ... | ... |

STORAGE EXTENT CONFIGURATION INFORMATION

FIG. 6

| 31011 | 31013 | 31014 | 31015 | 31016 | 31012 | 31017 |
|---|---|---|---|---|---|---|
| STORAGE SUBSYSTEM IDENTIFICATION INFORMATION | STORAGE EXTENT IDENTIFICATION INFORMATION | STORAGE CAPACITY | STORAGE EXTENT ATTRIBUTE INFORMATION | CREATION DATE | COMPUTER IDENTIFICATION INFORMATION | APPLICATION HOST GROUP IDENTIFICATION INFORMATION |
| 50:00:01:1E: 0A:E8:02 | 00:01 | 200GB | Read Only | 2004-03-31 | 20:01:10:00:AE: 32:01:3B | Group_A |
| | ... | ... | ... | ... | ... | ... |
| | 00:1B | 100GB | Read Only | 2004-10-31 | 20:01:10:00:C5: 30:9F:02 | Group_B |
| | ... | ... | ... | ... | ... | ... |
| | 00:41 | 30GB | Read Only | 2004-04-20 | 20:01:10:00:DB: A2:69:CD | Group_E, Group_F |
| | ... | ... | ... | ... | ... | ... |
| | 01:01 | 500GB | Normal | n/a | 20:01:10:00:0A: 0B:C8:F2 | Group_C |
| | 01:02 | 400GB | Normal | n/a | ... | ... |
| | ... | ... | ... | ... | ... | ... |
| | 02:01 | 20GB | Normal | n/a | n/a | n/a |
| | 02:02 | 20GB | Normal | n/a | ... | ... |
| | ... | ... | ... | ... | ... | ... |
| 50:00:01:A3:BB :01:07 | 0A:01 | 50GB | Read Only | 2004-09-30 | 20:01:10:00:C5 :30:9F:02 | Group_B |
| | 0A:02 | 50GB | n/a | n/a | n/a | n/a |
| ... | | | | | | |

STORAGE EXTENT CONFIGURATION MANAGEMENT INFORMATION ~310

FIG. 7

| APPLICATION HOST GROUP IDENTIFICATION INFORMATION (31021) | APPLICATION HOST GROUP NAME (31022) | COMPUTER IDENTIFICATION INFORMATION (31023) | RETENTION TERM (31024) |
|---|---|---|---|
| Group_A | SETTLEMENT DB | 20:01:10:00:AE:32:01:3B | 10year |
| | | 20:01:10:00:B3:10:6E:A6 | |
| | | 20:01:10:00:BB:1A:20:08 | |
| Group_B | CUSTOMER DB | 20:01:10:00:C5:30:9F:02 | 3month |
| Group_C | IN-COMPANY E-MAIL | 20:01:10:00:0A:0B:C8:F2 | n/a |
| ... | ... | ... | ... |
| Group_N | BACKUP | 20:01:10:00:DB:A2:69:CD | 65535year |

3102

APPLICATION HOST GROUP MANAGEMENT INFORMATION

FIG. 8

| APPLICATION HOST GROUP IDENTIFICATION INFORMATION (31041) | LOGICAL LIMITATION VALUE (31042) | STORAGE RESOURCE POOL IDENTIFICATION INFORMATION (31043) | STORAGE RESOURCE POOL LOGICAL LIMITATION VALUE (31044) |
|---|---|---|---|
| Group_A | 800GB | Tier-1 | n/a |
| | | Tier-2 | n/a |
| Group_B | 600GB | n/a | n/a |
| Group_A, Group_B | 1100GB | Tier-1 | 500GB |
| | | Tier-2 | 600GB |
| | | Tier-3 | n/a |
| ... | ... | ... | ... |
| Group_N | n/a | n/a | n/a |

3104

STORAGE RESOURCE ASSIGNMENT MANAGEMENT INFORMATION

FIG. 9

| STORAGE RESOURCE POOL IDENTIFICATION INFORMATION | STORAGE EXTENT IDENTIFICATION INFORMATION ||
|---|---|---|
| | STORAGE SUBSYSTEM IDENTIFICATION INFORMATION | STORAGE EXTENT IDENTIFICATION INFORMATION |
| Tier-1 | 50:00:01:1E:0A:E8:02 | 00:01, 00:02, 00:03, ⋯ 01:1F |
| Tier-2 | 50:00:01:C2:13:3B:EF | 02:2A, 02:2B, ⋯ 02:3F |
| Tier-3 | 50:00:01:A3:BB:01:07 | 0A:01, 0A:02 |

STORAGE RESOURCE POOL MANAGEMENT INFORMATION

FIG. 10

| APPLICATION HOST GROUP IDENTIFICATION INFORMATION (31091) | | STORAGE RESOURCE CONFIGURATION PROGRESS INFORMATION (31093) | | | | | | |
|---|---|---|---|---|---|---|---|---|
| | | 2004-03 | 2004-04 | ... | 2005-02 | 2005-03 | ... | 2005-08 |
| Group_A | PHYSICAL LIMITATION VALUE | 300GB | 300GB | ... | 500GB | n/a | ... | n/a |
| | Tier-1 | 100GB | 100GB | ... | 100GB | n/a | ... | n/a |
| | Tier-2 | 200GB | 200GB | ... | 400GB | n/a | ... | n/a |
| | LOGICAL LIMITATION VALUE | 800GB | 800GB | ... | 800GB | n/a | ... | n/a |
| | Tier-1 | n/a | n/a | ... | n/a | n/a | ... | n/a |
| | Tier-2 | n/a | n/a | ... | n/a | n/a | ... | n/a |
| | ASSIGNED CAPACITY | 200GB | 250GB | ... | 400GB | n/a | ... | n/a |
| | Tier-1 | 50GB | 50GB | ... | 50GB | n/a | ... | n/a |
| | Tier-2 | 150GB | 200GB | ... | 350GB | n/a | ... | n/a |
| | RETENTION TERM EXPIRED CAPACITY | 0GB | 0GB | ... | 200GB | 300GB | ... | 550GB |
| | Tier-1 | 0GB | 0GB | ... | 50GB | 100GB | ... | 300GB |
| | Tier-2 | 0GB | 0GB | ... | 150GB | 200GB | ... | 250GB |
| ... | ... | ... | ... | ... | ... | ... | ... | ... |
| Group_A, Group_B | PHYSICAL LIMITATION VALUE | 900GB | 900GB | ... | 1100GB | n/a | ... | n/a |
| | Tier-1 | 100GB | 100GB | ... | 100GB | n/a | ... | n/a |
| | Tier-2 | 200GB | 200GB | ... | 400GB | n/a | ... | n/a |
| | Tier-3 | 600GB | 600GB | ... | 600GB | n/a | ... | n/a |
| | LOGICAL LIMITATION VALUE | 600GB | 600GB | ... | 1100GB | n/a | ... | n/a |
| | Tier-1 | 500GB | 500GB | ... | 500GB | n/a | ... | n/a |
| | Tier-2 | 400GB | 400GB | ... | 600GB | n/a | ... | n/a |
| | Tier-3 | n/a | n/a | ... | n/a | n/a | ... | n/a |
| | ASSIGNED CAPACITY | 200GB | 250GB | ... | 850GB | n/a | ... | n/a |
| | Tier-1 | 50GB | 50GB | ... | 400GB | n/a | ... | n/a |
| | Tier-2 | 150GB | 200GB | ... | 350GB | n/a | ... | n/a |
| | Tier-3 | 0GB | 0GB | ... | 100GB | n/a | ... | n/a |
| | RETENTION TERM EXPIRED CAPACITY | 0GB | 0GB | ... | 200GB | 300GB | ... | 650GB |
| | Tier-1 | 0GB | 0GB | ... | 50GB | 100GB | ... | 300GB |
| | Tier-2 | 0GB | 0GB | ... | 150GB | 200GB | ... | 250GB |
| | Tier-3 | 0GB | 0GB | ... | 0GB | 0GB | ... | 100GB |

3109 STORAGE RESOURCE AMOUNT PROGRESS TABULATION RESULT INFORMATION

FIG. 11

VIRTUAL STORAGE EXTENT CONFIGURATION INFORMATION

VIRTUAL STORAGE EXTENT CONFIGURATION MANAGEMENT INFORMATION

| STORAGE RESOURCE POOL IDENTIFICATION INFORMATION | | STORAGE RESOURCE CONFIGURATION PROGRESS INFORMATION | | | |
|---|---|---|---|---|---|
| | | 2004-03 | 2004-04 | ... | 2005-02 |
| Tier-1 | PHYSICAL LIMITATION VALUE | 600GB | 600GB | ... | 1000GB |
| | LOGICAL LIMITATION VALUE | 500GB | 500GB | ... | 900GB |
| | ASSIGNED CAPACITY | 150GB | 200GB | ... | 800GB |
| Tier-2 | PHYSICAL LIMITATION VALUE | 400GB | 400GB | ... | 400GB |
| ... | ... | ... | ... | ... | ... |

31039 — 31033 — 31035 — 31036 — 31037 — 3103

STORAGE RESOURCE AMOUNT PROGRESS INFORMATION

FIG. 26

| VIRTUAL STORAGE EXTENT IDENTIFICATION INFORMATION (31051) | | STORAGE RESOURCE CONFIGURATION PROGRESS INFORMATION (31053) | | | |
|---|---|---|---|---|---|
| | | 2004-03 | 2004-04 | ... | 2005-02 |
| 00:01 | PHYSICAL LIMITATION VALUE | 600GB | 600GB | ... | 1000GB |
| | LOGICAL LIMITATION VALUE | 500GB | 500GB | ... | 900GB |
| | USED CAPACITY | 50GB | 100GB | ... | 700GB |
| 00:02 | PHYSICAL LIMITATION VALUE | 1000GB | 1000GB | ... | 1400GB |
| | LOGICAL LIMITATION VALUE | 500GB | 500GB | ... | 500GB |
| | USED CAPACITY | 100GB | 100GB | ... | 400GB |
| ... | ... | ... | ... | ... | ... |

31055, 31056, 31058, 3105

VIRTUAL STORAGE EXTENT RESOURCE AMOUNT PROGRESS INFORMATION

FIG. 27

STORAGE RESOURCE MANAGEMENT METHOD FOR STORAGE SYSTEM

CLAIM OF PRIORITY

The present application claims priority from Japanese patent application P2005-228246 filed on Aug. 5, 2005, the content of which is hereby incorporated by reference into this application.

BACKGROUND

This invention relates to a computer system which includes a computer and a storage subsystem, and more particularly to a technology of managing a storage extent of the storage subsystem.

There has been known a storage area network (SAN) for connecting one or more external storage subsystems to one or more computers. The storage area network is particularly effective when a plurality of computers share one large storage subsystem. A storage system that includes the storage area network has high expandability as a storage subsystem or a computer can be easily added or deleted.

There has been known a storage system for managing a storage resource amount by a storage subsystem unit.

There has additionally been known a storage system which causes a management computer to display details of storage resource amounts used by computers or details of storage resource amounts of storage subsystems as described in JP 2004-139494 A.

A law has been implemented to oblige a company or a public institution to retain data for a certain period. For example, the law that obliges data retention is SEC17-a, HIPAA, or the like in the United States. There has been known a hierarchical storage system conform to this law.

The hierarchical storage system includes a plurality of storage subsystems different in characteristics. The hierarchical storage system divides a storage extent of each storage subsystem into a plurality of layers. Then, data are arranged in the layers according to data values.

There has been known a storage system for combing a plurality of logical volumes to be managed as one virtual volume.

Furthermore, there has been known a technology which causes a monitor system to monitor an information system through a network as described in JP 2001-325222 A.

SUMMARY

A conventional storage system manages a storage extent by the storage subsystem unit. However, it is unable to manage the storage extent by an application host group unit.

A shortage of storage extents may occur in the storage system in the case of storing data inhibited to be deleted by a law. In such a case, the conventional storage system cannot forecast a shortage of storage resources.

The storage system can delete data whose retention term has expired. However, according to the conventional storage system, a administrative user cannot easily understand a capacity of a storage extent which stores retention term expired data.

This invention has been developed with the aforementioned problems in mind. It is therefore an object of this invention to provide a computer system which can easily manage a storage extent of a storage subsystem.

An embodiment of invention is characterized in that in a computer system which includes: a storage subsystem for storing data in a storage extent; a host computer to store data in the storage extent of the storage subsystem; and a management computer for managing the storage subsystem and the host computer, the storage subsystem creates storage extent configuration information containing a correspondence between the storage extent and a group to manage the storage extent by a group unit, and the management computer stores group management information for managing a data protection term for each a group, obtains the storage extent configuration information created by the storage subsystem, calculates an assigned capacity which is a sum total of capacities of the storage extents assigned to the groups for each group based on the obtained storage extent configuration information, forecasts a capacity to be assigned in the future for each group based on the calculated assigned capacity, calculates a protection term expired capacity which is a sum total of capacities of the storage extents storing protection term expired data for each group based on the stored group management information and the obtained storage extent configuration information, and outputs the calculated assigned capacity, the forecast capacity to be assigned in the future, and the calculated protection term expired capacity.

According to the embodiment of this invention, it is possible to easily manage the storage extent of the storage subsystem.

BRIEF DESCRIPTION OF THE DRAWINGS

The present invention can be appreciated by the description which follows in conjunction with the following figures, wherein:

FIG. 6 shows a configuration of storage extent configuration information of the storage subsystem according to the first embodiment of this invention;

FIG. 7 shows a configuration of storage extent configuration management information of the management computer according to the first embodiment of this invention;

FIG. 8 shows a configuration of application host group identification information of the management computer according to the first embodiment of this invention;

FIG. 9 shows a configuration of storage resource assignment management information of the management computer according to the first embodiment of this invention;

FIG. 10 shows a configuration of storage resource pool management information of the management computer according to the first embodiment of this invention;

FIG. 11 shows a configuration of storage resource amount progress tabulation result information of the management computer according to the first embodiment of this invention;

FIG. 26 shows a configuration of storage resource amount progress information of the management computer according to the second embodiment of this invention;

FIG. 27 shows a configuration of virtual storage extent resource amount progress information of the management computer according to the second embodiment of this invention;

DETAILED DESCRIPTION OF THE INVENTION

The preferred embodiments of this invention will be described below with reference to the accompanying drawings.

First Embodiment

Figure 1:
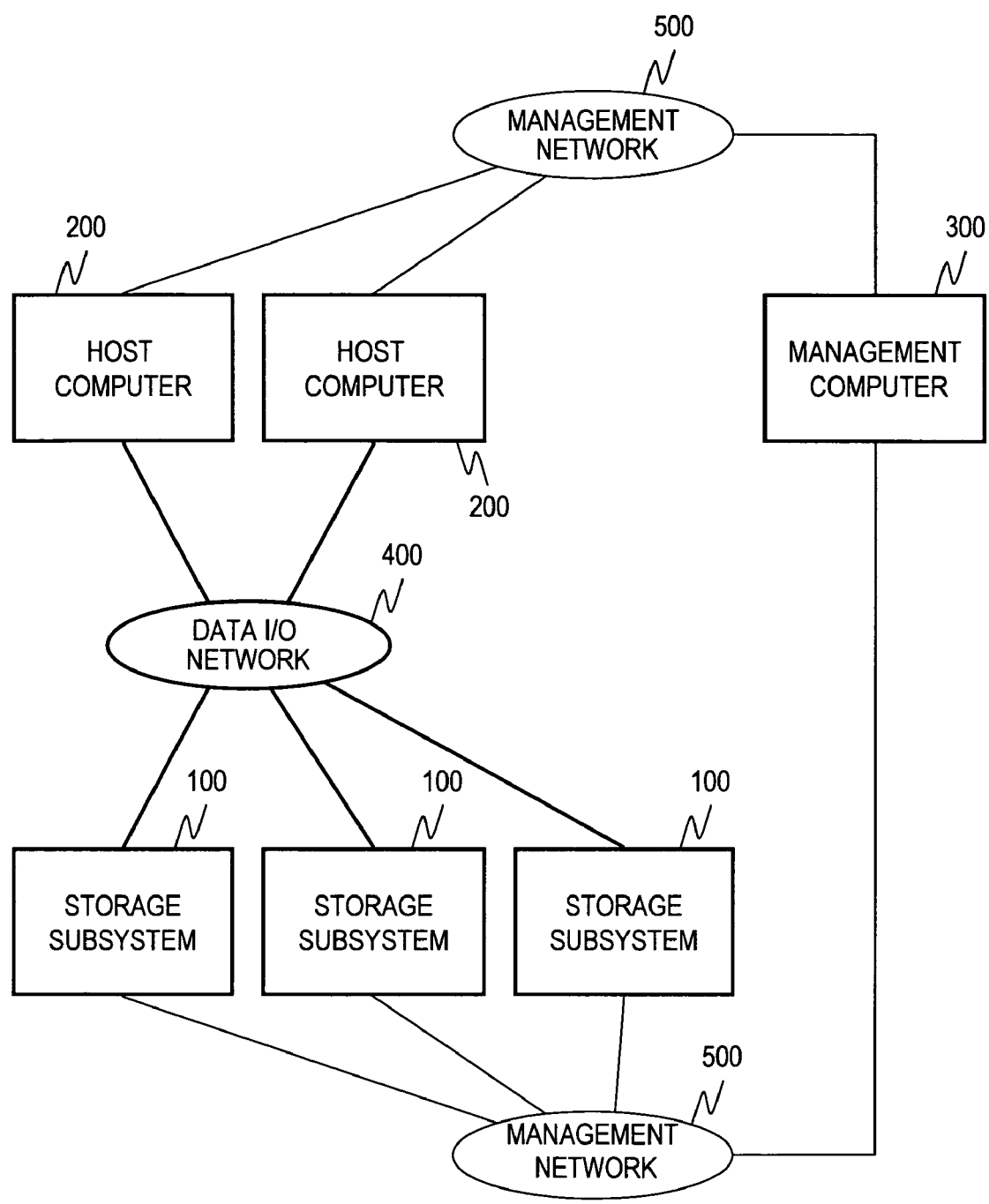
FIG. 1 is a block diagram of a computer system according to a first embodiment of this invention.

FIG. 1 is a block diagram of a computer system according to a first embodiment of this invention.

The computer system includes a storage subsystem 100, a host computer 200, and a management computer.

As will be described later with reference to FIG. 2, the storage subsystem 100 stores data from the host computer 200. As will be described later with reference to FIG. 4, the host computer 200 inputs/outputs data to/from the storage subsystem 100. As will be described later with reference to FIG. 5, the management computer 300 manages the storage subsystem 100 and the host computer 200.

The storage subsystem 100 and the host computer 200 are interconnected through a data I/O network 400 to communicate with each other. The data I/O network 400 includes one or more connectors. For example, the data I/O network 400 includes a network connector such as a fibre channel or Ethernet.

The management computer 300, the storage subsystem 100, and the host computer 200 are interconnected through a management network 500 to communicate with one another. As in the case of the data I/O network 400, the management network 500 includes one or more connectors.

The management network 500 and the data I/O network 400 may form a single network, rather than each being an independent network.

The management computer 300 may be arranged at a place different from those of the storage subsystem 100 and the data I/O network 400. Accordingly, the management computer 300 can manage the storage subsystem 100 and the host computer 200 from a remote place.

Figure 2:
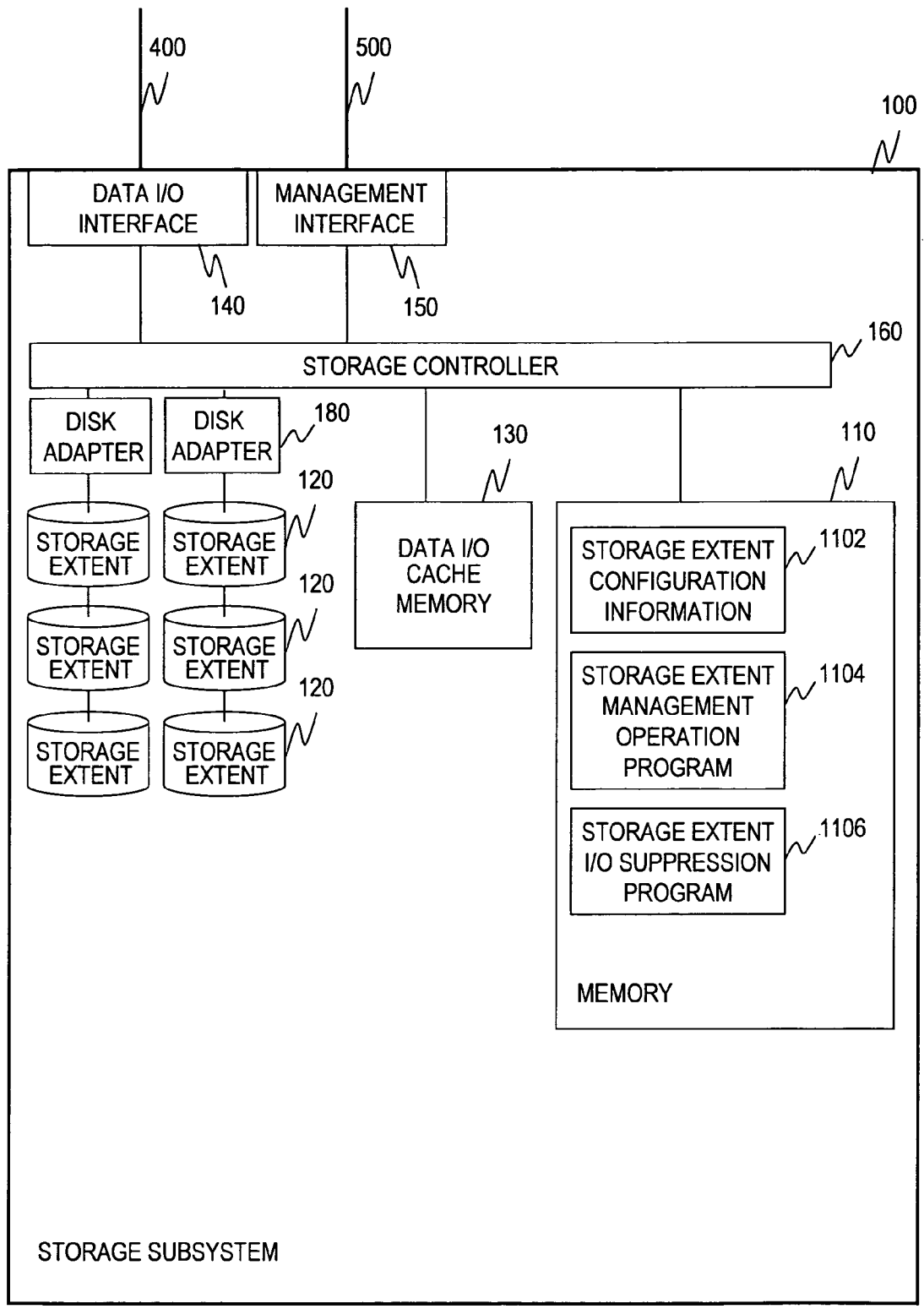
FIG. 2 is a lock diagram of a storage subsystem according to the first embodiment of this invention.

FIG. 2 is a block diagram of the storage subsystem 100 according to the first embodiment of this invention.

The storage subsystem 100 includes a data I/O network interface 140, a management network interface 150, a storage controller 160, a disk adapter 180, a memory 110, a storage extent 120, and a data I/O cache memory 130.

The data I/O network interface 140, the management network interface 150, the disk adapter 180, the memory 110, and the data I/O cache memory 130 are interconnected through the storage controller 160.

The data I/O network interface 140 is an interface connected to the host computer 200 through the data I/O network 400. The management network interface 150 is an interface connected to the management computer 300 through the management network 500.

The data I/O network interface 140 and the management network interface 150 are network I/O units according to a conventional communication technology such as a fibre channel or Ethernet.

As shown in FIG. 2, the storage subsystem 100 includes one data I/O network interface 140. However, the number of the data I/O network interfaces 140 is not limited to one. Similarly, the storage subsystem 100 includes one management network interface 150. However, the number of the management network interfaces 150 is not limited to one. The data I/O network interface 140 and the management network interface 150 may form a single interface rather than each being an independent interface.

The storage controller 160 executers programs stored in the memory 110 to perform various processing operations. The storage controller 160 controls the entire storage subsystem 100.

The memory 110 is, for example, a magnetic disk or a volatile semiconductor memory. The memory 110 stores the programs executed by the storage controller 160 and information used by the storage controller 160. The memory 110 stores storage extent configuration information 1102, a storage extent management operation program 1104, and a storage extent I/O suppression program 1106.

As will be described later with reference to FIG. 6, the storage extent configuration information 1101 regards a configuration of the storage extent 120.

The storage extent management operation program 1104 changes the configuration and attributes of the storage extent 120. The storage extent I/O suppression program 1106 suppresses inputting/outputting of data to/from the storage extent 120.

As will be described later with reference to FIG. 3, the storage extent 120 stores data input from the host computer 200. The storage extent 120 is obtained by reconfiguring a physical storage extent of the storage subsystem 100 into a logical unit identified by the host computer 200. The physical storage extent of the storage subsystem 100 is, for example, a magnetic disk, an optical medium, a nonvolatile semiconductor memory, or a volatile semiconductor memory. There is no limitation on the number or a capacity of storage extents 120.

The disk adapter 180 controls inputting/outputting of data to/from the storage extent 120.

The data I/O cache memory 130 temporarily stores data input/output to/from the storage extent 120. Accordingly, the storage subsystem 100 can enhance the speed of the inputting/outputting of data to/from the storage extent 120. The data I/O cache memory 130 is generally a volatile semiconductor memory. However, the data I/O cache memory 130 may be another storage medium such as a magnetic disk. There is no imitation on a capacity of the data I/O cache memory 130.

Figure 3:
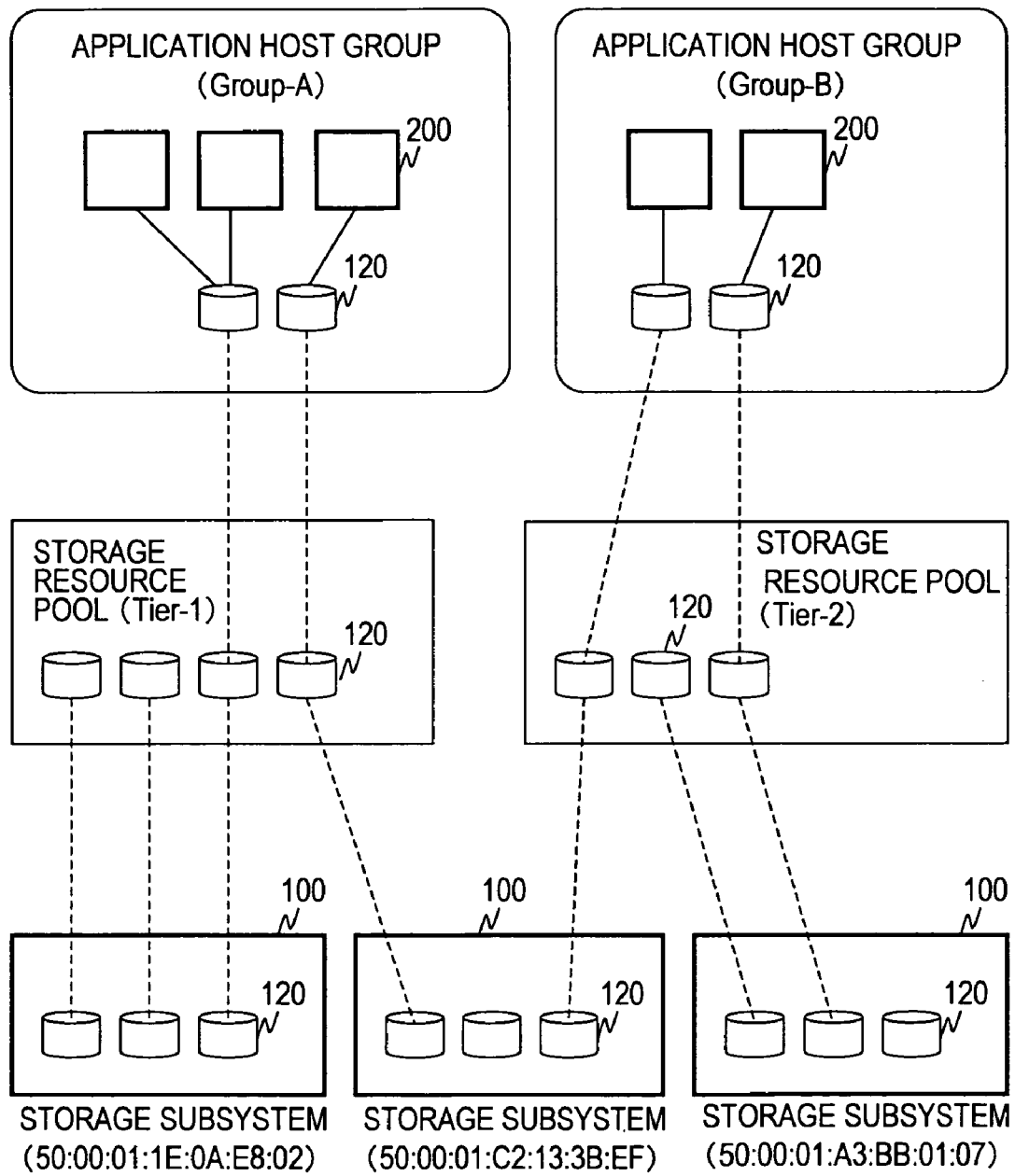
FIG. 3 is an explanatory diagram of a storage extent of the storage subsystem according to the first embodiment of this invention.

FIG. 3 is an explanatory diagram of the storage extent 120 of the storage subsystem 100 according to the first embodiment of this invention.

The storage extent 120 of the storage subsystem 100 belongs to one of storage resource pools. The storage resource pools are logical configuration units to largely classify the storage extents 120.

The host computer 200 belongs to one of application host groups. The application host group is a set of host computers 200 used for the same application. The host computer 200 may belong to a plurality of application host groups.

The storage resource pool is assigned to the application host group. A plurality of storage resource pools may be assigned to one application host group. One storage resource pool may be assigned to a plurality of application host groups.

Additionally, the storage extent 120 is assigned to the application host group. Specifically, the storage extent included in the storage resource pool assigned to the application host group is assigned to the application host group. A plurality of storage extents 120 may be assigned to one application host group. One storage extent 120 may be assigned to a plurality of application host groups.

The host computer 200 inputs/outputs data to/from the storage extent 120 assigned to an application host group to which the host computer 200 belongs.

In this case, a sum total of capacities of storage extents 120 assigned to application host groups is an assigned capacity of the application host groups.

Figure 4:
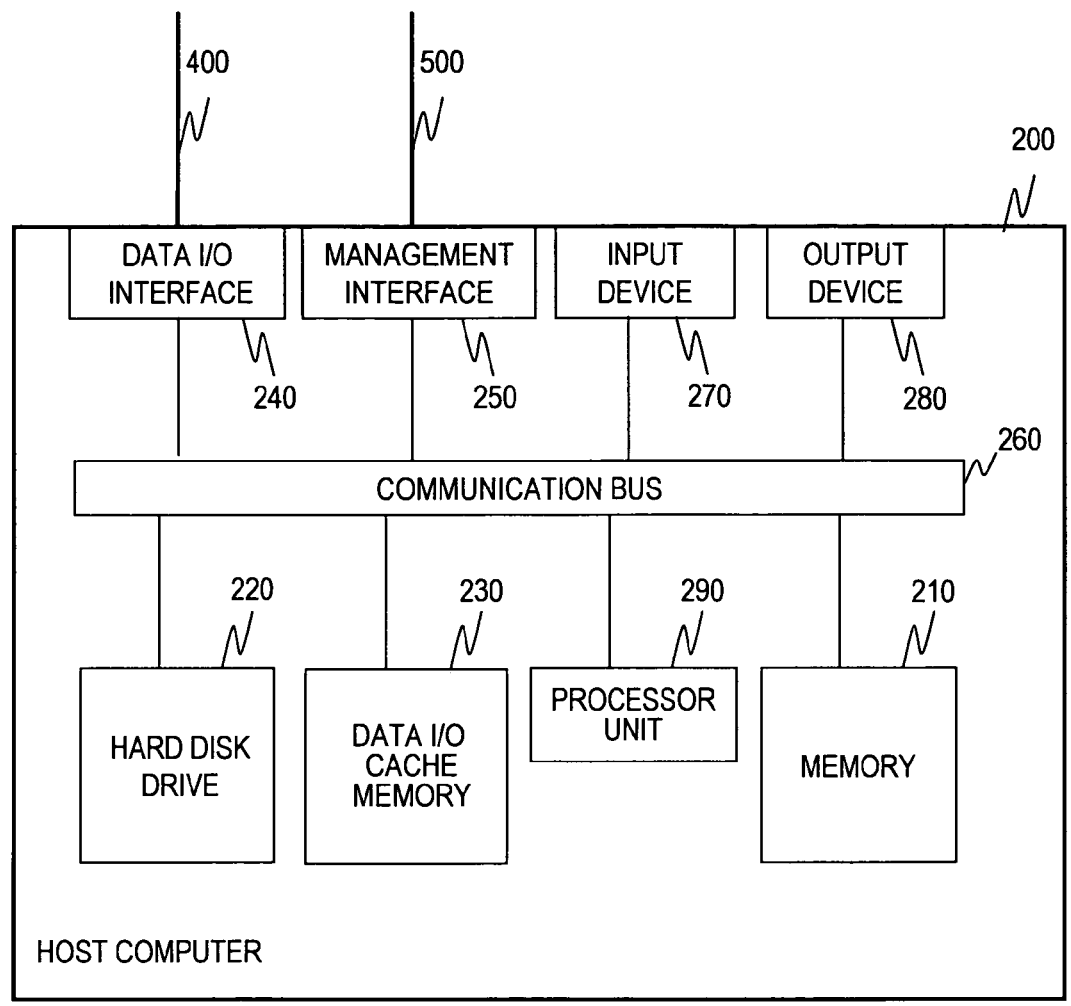
FIG. 4 is a block diagram of a host computer according to the first embodiment of this invention.

FIG. 4 is a block diagram of the host computer 200 according to the first embodiment of this invention.

The host computer 200 has a configuration similar to that of a general-purpose computer. The host computer 200 includes a data I/O network interface 240, a management network interface 250, an input device 270, an output device 280, a processor unit 290, a memory 210, a hard disk drive 220, and a data I/O cache memory 230.

The data I/O network interface 240, the management network interface 250, the input device 270, the output device 280, the processor unit 290, the memory 210, the hard disk drive 220, and the data I/O cache memory 230 are interconnected through a communication bus 260.

The data I/O network interface 240 is an interface connected to the storage subsystem 100 through the data I/O network 400. The management network interface 250 is an interface connected to the management computer 300 through the management network 500.

The data I/O network interface 240 and the management network interface 250 are network I/O units of a conventional communication technology such as a fibre channel or Ethernet. As shown in FIG. 4, the host computer 200 includes one data I/O network interface 240. However, the number of interfaces 240 is not limited to one. Similarly, the host computer 200 includes one management network interface 250. However, the number of interfaces 250 is not limited to one. The data I/O network interface 240 and the management network interface 250 may form a single interface rather than each being an independent interface.

The input device 270 is, for example, a keyboard, or a mouse, through which a user inputs various pieces of information. The output device 280 is, for example, a liquid crystal display which outputs various pieces of information.

The processor unit 290 executes programs stored in the memory 210 to perform various processing operations. Specifically, the processing unit 290 executes an operating system (OS) to control the entire host computer 200. Additionally, the processor unit 290 executes an application program such as a database or accounting program. The processor unit 290 inputs/outputs data to/from the storage extent 120 of the storage subsystem 100. The processor unit 290 updates data stored in the storage extent 120 of the storage subsystem 100.

The memory 210 is, for example, a magnetic disk or a volatile semiconductor memory. The memory 210 stores the programs executed by the processor unit 290 and information or the like used by the processor unit 290j. The memory 210 stores, for example, the operating system (OS) and the application program.

The hard disk drive 220 includes a magnetic disk or the like and stores various pieces of information.

The data I/O cache memory 230 temporarily stores data input/output to/from the storage extent 120 of the storage subsystem 100. The data I/O cache memory 230 is generally a volatile semiconductor memory. However, it may be another storage medium such as a magnetic disk. There is no imitation on a capacity of the data I/O cache memory 230.

Figure 5:
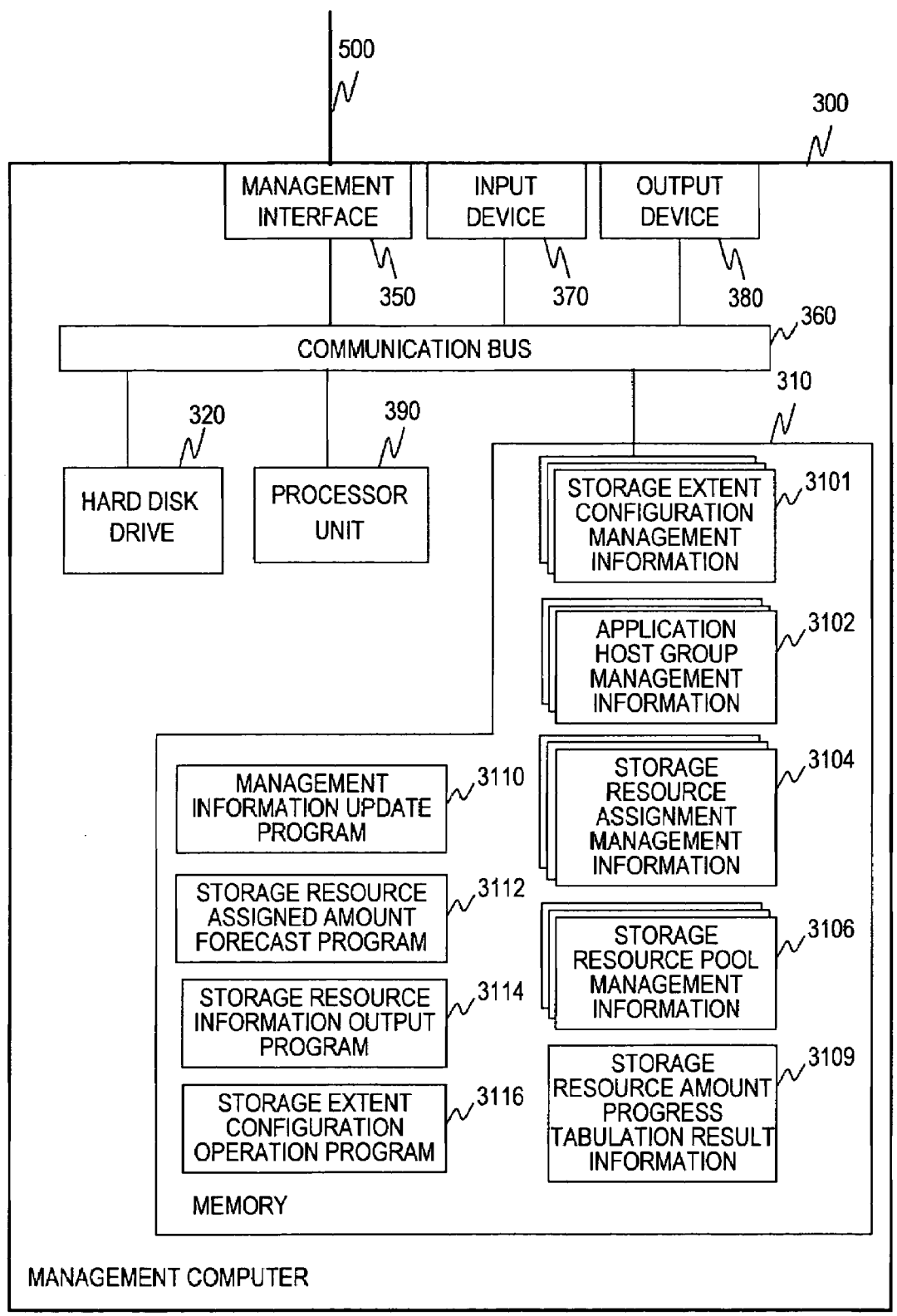
FIG. 5 is a block diagram of a management computer according to the first embodiment of this invention.

FIG. 5 is a block diagram of the management computer 300 according to the first embodiment of this invention.

The management computer 300 includes a management network interface 350, an input device 370, an output device 380, a processor unit 390, a hard disk drive 320, and a memory 310, The management network interface 350, the input device 370, the output device 380, the processor unit 390, the hard disk drive 320, and the memory 310 are interconnected through a communication bus 360.

The management network interface 350 is an interface connected to the storage subsystem 100 and the host computer 200 through the management network 500.

The input device 370 is, for example, a keyboard or a mouse, through which a administrative user inputs various pieces of information. The output device 380 is, for example, a liquid crystal display which outputs various pieces of information.

The hard disk drive 320 includes a magnetic disk to store various pieces of information.

The processor unit 390 executes programs stored in the memory 310 to perform various processing operations.

The memory 310 is, for example, a magnetic disk or a volatile semiconductor memory. The memory 310 stores, for example, the programs executed by the processor unit 390 and information used by the processor unit 390.

Specifically, the memory 310 stores storage extent configuration management information 3101, application host group management information 3102, storage resource assignment management information 3104, storage resource pool management information 3106, storage resource amount progress tabulation result information 3109, a management information update program 3110, a storage resource assigned amount forecast program 3112, a storage resource information output program 3114, and a storage extent configuration operation program 3116.

As will be described later with reference to FIG. 7, the storage extent configuration management information 3101 regards the configuration of the storage extent 120 of the storage subsystem 100.

As will be described later with reference to FIG. 8, the application host group management information 3102 regards a correspondence between the application host group and the host computer 200.

As will be described later with reference to FIG. 9, the storage resource assignation management information 3104 regards a correspondence between the application host group and the storage resource pool.

As will be described later with reference to FIG. 10, the storage resource pool management information 3106 regards a correspondence between the storage resource pool and the storage extent 120.

The storage resource amount progress tabulation result information 3109 is information summarized from the storage extent configuration management information 3101, the application host group management information 3102, the storage resource assignment management information 3104, and the storage resource pool management information 3106.

The management information update program 3110 updates the storage extent configuration management information 3101, the application host group management information 3102, the storage resource assignment management information 3104, the storage resource pool management information 3106, and the storage resource amount progress tabulation result information 3109.

Specifically, the management information update program 3110 newly creates storage extent configuration management information 3101, application host group management information 3102, storage resource assignment management information 3104, and storage resource pool management information 3106 at predetermined intervals. Then, based on these pieces of created management information 3101, 3102, 3104 and 3106, the storage resource amount progress tabulation result information 3109 is updated.

According to this embodiment, the management information update program 3110 creates pieces of management information 3101, 3102, 3104 and 3106, and updates the storage resource amount progress tabulation result information 3109 once a month.

The storage resource assigned amount forecast program 3112 forecasts a future assigned amount for each application host group based on the storage resource amount progress tabulation result information 3109.

The storage resource information output program 3114 causes the output device 380 to output the information contained in the storage resource amount tabulation result information 3109 and the future assigned amount forecast by the storage resource assigned amount forecast program 3112. A screen output by the output device 380 will be described later with reference to FIGS. 12 to 17. Through the screen output, the administrative user can visually obtain various pieces of information.

The storage extent configuration operation program 3116 sets or changes the configuration of the storage extent of the storage subsystem 100.

FIG. 6 shows a configuration of the storage extent configuration information 1102 of the storage subsystem 100 according to the first embodiment of this invention.

The storage subsystems 100 each store storage extent configuration information 1102. FIG. 6 shows storage extent configuration information 1102 stored by the storage subsystem 100 whose storage subsystem identification information is "50:00:01:1E:0A:E8:02".

The storage extent configuration information 1102 contains storage extent identification information 11023, a storage capacity 11024, storage extent attribute information 11025, a creation date 11026, a retention term 11027, and computer identification information 11022.

The storage extent identification information 11023 is a unique identifier of the storage extent 120.

The storage capacity 11024 is a data amount which the storage extent 120 can store. In FIG. 6, the storage capacity 11024 is represented in units of gigabytes (GB). However, other units may be used.

The storage extent attribute information 11025 regards attributes of the storage extent 120. Attributes are given for each storage extent 120. According to this embodiment, when the storage extent attribute information 11025 is "Read Only", the storage extent I/O suppression program 1106 suppresses writing of data in the storage extent 120.

Thus, the host computer 200 cannot write data in the storage extent 120 whose storage extent attribute information 11025 is "Read Only". The host computer 200 cannot change a storage capacity of the storage extent 120 whose storage extent attribute information 11025 is "Read Only".

The host computer 200, however, can read data from the storage extent 120 whose storage extent attribute information 11025 is "Read Only".

The host computer 200 can read and write data from and in the storage extent 120 whose storage extent attribute information 11025 is "Normal".

The creation date 11026 is a date on which writing in the storage extent 120 is inhibited. In other words, the creation date 11026 is a date on which the storage extent attribute information 11025 of the storage extent 120 is changed to "Read Only".

The creation date 11026 of a record whose storage extent attribute information 11025 is "Normal" stores "n/a (not applicable)" indicating "unregistered."

The retention term 11027 is a period during which writing in the storage extent 120 is prohibited. In other words, the storage extent I/O suppression program 1106 suppresses writing of data in the storage extent 120 for a period of the retention term 11027 from the creation date 11026. After the retention term 11027 expires, the storage extent management operation program 1104 changes the storage extent attribute information 11025 from "Read Only" to "Normal". Accordingly, the storage extent management operation program 1104 changes attributes of the storage extent 120 whose retention term 11027 has expired. Then, the host computer 200 can write data in the storage extent 120.

The computer identification information 11022 is a unique identifier of the host computer 200 to which the storage extent 120 is assigned. In FIG. 6, the computer identification information 11022 is a world wide name (WWN). WWN is an identifier to uniquely identify a device on a fibre channel network.

The storage extent 120 whose storage extent identification information 11023 is "00:01" will be described. In the storage extent 120, a storage capacity 11024 is "2000 GB". The storage extent 120 is assigned to the host computer 200 whose computer identification information 11022 is "20:01:10:00: AE:32:01:3B", and connected from the host computer 200.

The storage extent 120 has an attribute "Read Only" for "10 years" of the retention term 11027 from "March 31 of 2004" of a creation date 11026. Accordingly, the host computer 200 can read data from the storage extent 120 but cannot write data in the storage extent 120.

Next, the storage extent 120 whose storage extent identification information 11023 is "01:01" will be described. The storage extent 120 is assigned to the host computer 200 whose computer identification information 11022 is "20:01:10:00: 0A:0B:C8:F2", and connected from the host computer 200. The storage extent 120 has the storage extent attribute information 11024 of "Normal". Thus, the host computer 200 can write data in the storage extent 120. Additionally, the host computer 200 can change a capacity of the storage extent 120.

Next, the storage extent 120 whose storage extent identification information 1102 is "02:01" will be described. The storage extent 120 is neither assigned to any host computers 200, nor connected from all the host computers 200.

FIG. 7 shows a configuration of the storage extent configuration management information 3101 of the management computer 300 according to the first embodiment of this invention.

The storage extent configuration management information 3101 contains storage subsystem identification information 31011, storage extent identification information 31013, a storage capacity 31014, storage extent attribute information 31015, a creation date 31016, computer identification information 31012, and application host group information 31017.

The storage subsystem identification information 31011 is a unique identifier of the storage subsystem 100. In FIG. 7, the storage subsystem identification information 31011 is WWN of the storage subsystem 100.

The storage extent identification information 31013 is a unique identifier of the storage extent 120. The storage capacity 31014 is a data amount which the storage extent 120 can store. The storage extent attribute information 31015 regards attributes of the storage extent 120. The creation date 31016 is a date on which writing in the storage extent 120 is inhibited.

The computer identification information 31012 is a unique identifier of the host computer 200 to which the storage extent 120 is assigned. The application host group identification information 31017 is a unique identifier of the application host group to which the host computer 200 belongs.

The management information update program 3110 obtains storage extent configuration information 1102 from all the storage subsystems 100 at predetermined intervals. Then, based on the obtained storage extent configuration information 1102, the management information update program 3110 updates the storage extent configuration management information 3101.

Specifically, the management information update program 3110 stores the identifier of the storage subsystem 100, which has obtained storage extent configuration information 1102, in the storage subsystem identification information 31011 of the storage extent configuration management information 3101. Next, the storage extent identification information 11023 of the obtained storage extent configuration information 1102 is stored in the storage extent identification information 31013 of the storage extent configuration management information 3101.

Next, the storage extent attribute information 11025 of the obtained storage extent configuration information 1102 is stored in the storage extent attribute information 31015 of the storage extent configuration management information 3101. Next, the creation date 11026 of the obtained storage extent configuration information 1102 is stored in the creation date 31016 of the storage extent configuration management information 3101. Next, the computer identification information 11022 of the obtained storage extent configuration information 1102 is stored in the computer identification information 31012 of the storage extent configuration information 3101.

Subsequently, an identifier of the application host group to which the host computer 200 of the stored computer identification information 3102 belongs is decided based on the application host group management information 3102 shown in FIG. 8. Then, the decided identifier of the application host group is stored in the application host group identification information 31017 of the storage extent configuration management information 3101.

As described above, the management information update program 3110 creates the storage extent configuration management information 3101.

FIG. 8 shows a configuration of the application host group management information 3102 of the management computer 300 according to the first embodiment of this invention.

The management information update program 3110 creates the application host group management information 3102 based on information which the administrative user inputs through the input device 370.

The application host group management information 3102 contains application host group identification information 31021, an application host group name 31022, computer identification information 31023, and a retention term 31024.

The application host group identification information 31021 is a unique identifier of the application host group.

The application host group name 31022 is a name of the application host group, and an identifier uniquely identified by the administrative user. In FIG. 8, the application host group name 31022 represents use of data processed by the host computer 200 which belongs to the application host group. For example, "settlement DB", "in-company e-mail", or the like is stored in the application host group name 31022.

The computer identification information 31023 is a unique identifier of the host computer 200 which belongs to the application host group.

The retention term 31024 is a period during which data regarding the application host group is retained. When a data retention term is not set, "n/a" is stored in the retention term 31024. When data is not deleted, a sufficiently long period such as "65535 years" is stored as the retention term 31024.

Now, the application host group whose application host group identification information 31021 is "Group_A" will be described. The application host group name 31022 of the application host group is "settlement DB". Three host computers 200 belong to the application host group. Data regarding the application host group is retained for "10 years" of the retention term 31024.

FIG. 9 shows a configuration of the storage resource assignment management information 3104 of the management computer 300 according to the first embodiment of this invention.

The management information update program 3110 creates the storage resource assignment management information 3104 based on information input by the administrative user through the input device 370.

The storage resource assignment management information 3104 contains application host group identification information 31041, a logical limitation value 31042, storage resource pool identification information 31043, and a storage resource pool logical limitation value 31044.

The application host group identification information 31041 is a unique identifier of the application host group. A plurality of identifiers of application host groups may be stored in the application host group identification information 31041. In this case, the record includes information regarding a group obtained by combining all the application host groups stored in the application host group identification information 31041.

The logical limitation value 31042 is a logical limitation value of an assigned capacity of the application host group. The logical limitation value 31042 is set by the administrative user.

For example, the administrative user sets a value smaller than a physical limitation value in the logical limitation value 31042. The physical limitation value is a sum total of storage extents 120 physically assignable to the application host group, and a physical limitation value of an assigned capacity. In this case, when the assigned capacity exceeds the logical limitation value 31042, the management computer 300 issues a warning message. Accordingly, the management computer 300 can notify a shortage of the storage extent 120 to the administrative user, before the storage extent 120 physically becomes insufficient.

The storage resource pool identification information 31043 is a unique identifier of a storage resource pool assigned to the application host group. When all the storage resource pools are assigned to the application host group, "n/a" is stored in the storage resource pool identification information 31043. In this case, the management computer 300 can assign the storage extent 120 belonging to any one of the storage resource pools to the application host group.

The storage resource pool limitation value 31044 is a logical limitation value of an assigned capacity assigned from the storage resource pool to the application host group. When the storage extent 120 can be limitlessly assigned from the storage resource pool, "n/a" is stored as the storage resource pool limitation value 31044.

Now, the application group whose application host group information 31041 is "Group_A" will be described. The logical limitation value 31042 of the application host group is "8000 GB". The storage extent 120 belonging to a storage resource pool of "Tier-1" and the storage extent 120 belonging to a resource storage pool of "Tier-2" are assigned to the application host group.

Next, a record containing "Group-A" and "Group-B" stored in the application host group information 31041 will be described. According to this record, a logical limitation value 31042 of a group obtained by combining the application host groups of the "Group-A" and the "Group-B" is "1100 GB".

The storage extent 120 belonging to the storage resource pool of "Tier-1" is assigned to the group with a logical limitation value of "500 GB". Similarly, the storage extent 120 belonging to the storage resource pool of "Tier-2" is assigned to the group with a logical limitation value of "600 GB". Further, the storage extent 120 belonging to the storage resource pool of "Tier-3" is assigned to the group without any limitation of a logical limitation value.

Thus, the storage resource assignment management information 3104 may contain information regarding the group obtained by combining the plurality of application host groups.

In FIG. 9, a logical limitation value 31042 of "800 GB" is set in the application host group of "Group_A", and a logical limitation value 31042 of "600 GB" is set in the application host group of "Group_B". Simultaneously, a logical limitation value 31042 of "1100 GB" is set in the group obtained by combining these two application host groups.

FIG. 10 shows a configuration of the storage resource pool management information 3106 of the management computer 300 according to the first embodiment of this invention.

The storage resource pool management information 3106 contains storage resource pool identification information 31061 and storage extent identification information 31062.

The storage resource pool identification information 3106 is a unique identifier of a storage resource pool.

The storage extent identification information 31062 uniquely identifies the storage extent 120 belonging to the storage resource group, and contains storage subsystem identification information 31063 and storage extent identification information 31064.

The storage subsystem identification information 31063 is a unique identifier of the storage subsystem 100 which includes the storage extent 120 belonging to the storage resource pool.

The storage extent identification information 31064 is a unique identifier of the storage extent 120 which belongs to the storage resource pool and is included in the storage subsystem 100. When all the storage extents 120 included in the storage subsystem 100 belong to the storage resource pool, "n/a" is stored as the storage extent identification information 31064.

The storage resource pool management information 3106 may contain a storage resource pool name. The storage resource pool name is a name of the storage resource pool, and an identifier uniquely identified by the administrative user. In this case, the management computer 300 uses the storage resource pool name to output information regarding the storage resource pool through the output device 380.

The management information update program 3110 creates storage resource pool management information 3106 based on storage resource pool definition information input through the input device 370 by the administrative user.

The administrative user defines a storage resource pool according to an operation of the computer system. For example, the administrative user defines storage subsystems 100 of different characteristics as different storage resource pools. Additionally, the administrative user defines a storage resource pool based on I/O performance, a RADIO configuration level, network characteristics, an HDD type, a backup frequency and/or presence of a copied volume, and the like. The network characteristics are characteristics of the data I/O network 400, e.g., a fibre channel or iSCSI. The HDD type is a connection standard of the storage subsystem 100, e.g., SCSI or ATA.

FIG. 11 shows a configuration of the storage resource amount progress tabulation result information 3109 of the management computer 300 according to the first embodiment of this invention.

The storage resource amount progress tabulation result information 3109 contains application host group identification information 31091 and storage resource configuration progress information 31093. FIG. 11 shows storage resource amount progress tabulation result information 3109 as of February of 2005.

The application host group identification information 31091 is a unique identifier of an application host group.

The storage resource configuration progress information 31093 is a progress of various pieces of information regarding the application host group, and contains a physical limitation value 31095, a logical limitation value 31096, an assigned capacity 31097, and a retention term expired capacity 31098. Further, the storage resource configuration progress information 31093 contains a progress of various pieces of information for each storage resource pool assigned to the application host group.

The physical limitation value 31095 is a sum total of capacities of storage extents 120 physically assignable to the application host group, and a physical limitation value of the assigned capacity.

The logical limitation value 31096 is a logical limitation value of the assigned capacity of the application host group. The logical limitation value 31096 is a value set by the administrative user.

The assigned capacity 31097 is a sum total of capacities of storage extents 120 actually assigned to the application host group.

The retention term expired capacity 31098 is a sum total of capacities of storage extents 120 being assigned to the application host group and storing data whose retention term has expired.

The management information update program 3110 updates the storage resource amount progress tabulation result information 3109 based on the storage extent configuration management information 3101, the application host group management information 3102, the storage resource assignment management information 3104, and the storage resource pool management information 3106. For example, the storage resource amount update program 3110 adds information to the storage resource amount progress tabulation result information 3109 at a predetermined interval (e.g., once a month).

Specifically, the management information update program 3110 extracts the application host group information 31091 of the record to update the data from the storage resource amount progress tabulation result information 3109. Next, a record in which the extracted application host group identification information 31091 coincides with the application host group identification information 31041 of the storage resource assignment management information 3104 is selected from the storage resource assignment management information 3104. Next, the storage resource pool identification information 31043 is extracted from the selected record. When plural pieces of storage resource pool identification information 31043 are stored in the selected record, all the pieces of storage resource pool identification information 31043 are extracted.

Next, a record in which the extracted storage resource pool identification information 31043 coincides with the storage resource pool identification information 31061 is selected from the storage resource pool management information 3106. Next, the storage subsystem identification information 31063 and the storage extent identification information 31064 are extracted from the selected record.

Next, a record in which the extracted storage subsystem identification information 3106 coincides with the storage subsystem identification information 31011 of the storage extent configuration management information 3101 and the extracted storage extent identification information 31064 coincides with the storage extent identification information 31013 of the storage extent configuration management information 3101 is selected from the storage extent configuration information 3101. Next, storage capacities 31014 are extracted from the selected record.

Next, a sum total of the extracted storage capacities 31014 is calculated. Then, the calculated sum total of the storage capacities 31014 is stored as the physical limitation value 31095 of the storage resource amount progress tabulation result information 3109.

Similarly, the management information update program 3110 stores physical limitation values for each storage resource pool.

Next, the management information update program 3110 extracts application host group identification information 31091 of a record to update data from the storage resource amount progress tabulation result information 3109. Next, a record in which the extracted application host group identification information 31091 coincides with the application host group identification information 31041 of the storage resource assignment management information 3104 is selected from the storage resource assignment management information 3104. Next, a logical limitation value 31042, storage resource pool identification information 31043, and a storage resource pool logical limitation value 31044 are extracted from the selected record.

Then, the extracted logical limitation value 31042 is stored as the logical limitation value 31096 of the storage resource amount progress tabulation result information 3109. The extracted storage resource pool logical limitation value 31044 is stored as the logical limitation value for each storage resource pool.

Next, the management information update program 3110 extracts application host group identification information 31091 of a record to update data from the storage resource amount progress tabulation result information 3109. Next, all the records in which the extracted application host group identification information 31091 coincides with the application host group identification information 31017 of the storage extent configuration management information 3101 are selected from the storage extent configuration management information 3101.

Next, storage capacities 31014 are extracted from the selected records. Next, a sum total of the extracted storage capacities 31014 is calculated. Then, the calculated sum total of the storage capacities 31014 is stored in the assigned capacity 31097 of the storage resource amount progress tabulation result information 3109.

Similarly, the management information update program 3110 stores an assigned capacity of each storage resource pool. In this case, storage subsystem identification information 31011 and storage extent identification information 31013 are extracted from the records selected from the storage extent configuration management information 3101. Then, a record in which the extracted subsystem identification information 31011 coincides with the storage subsystem identification information 31063 of the storage resource pool management information 3106 and the storage extent identification information 31013 coincides with the storage extent identification information 31064 of the storage resource pool management information 3106 is selected from the storage resource pool management information 3106. Then, the storage resource pool identification information 31061 is extracted from the selected record. Next, a storage resource pool to which the storage extent 120 belongs is determined based on the extracted storage resource pool identification information 31061. Then, an assigned capacity for each storage resource pool is obtained.

Next, the management information update program 3110 extracts application host group identification information 31091 of a record to update data from the storage resource amount progress tabulation result information 3109. Next, a record in which the extracted application host group identification information 31091 coincides with the application host group identification information 31021 of the application host group management information 3102 is selected from the application host group information 3102. Next, a retention term 31024 is extracted from the selected record.

Next, all the records in which the extracted application host group identification information 31091 coincides with the application host group identification information 31017 of the storage extent configuration management information 3101 are selected from the storage extent configuration management information 3101. Next, a creation date 31016 is extracted from the selected records. Then, an extracted retention term 31024 is added to the extracted creation date 31016 to obtain a retention term expiry date of the storage extent 120 corresponding to the records.

Next, it is determined whether the retention term expiry date is in the past or not. If the obtained retention term expiry date is determined to be in the past, it is determined that the retention term of the storage extent 120 corresponding to the record has expired. Next, the record corresponding to storage extent 120 the retention term of which expired is specified among the records selected from the storage extent configuration management information 3101.

Next, storage capacities 31014 of the specified record are extracted. Then, a sum total of the extracted storage capacities 31014 is calculated. The calculated sum total of the storage capacities 31014 is stored in the retention term expired capacity 31098.

Similarly, the management information update program 3110 stores a retention term expired capacity of each storage resource pool.

The management information update program 3110 may similarly obtain a future retention term expired capacity 31098. In FIG. 11, a retention term expired capacity 31098 from March of 2005 to August of 2005, which are ahead of a present time, (February of 2005) is stored.

The management computer 300 displays the storage resource amount progress tabulation result information 3109 on the output device 380. The administrative user manages the computer system based on the storage resource amount progress tabulation result information 3109 displayed on the output device 380 of the management computer 300. The management computer 300 may display information regarding the storage resource amount progress tabulation result information 3109 in other forms.

For example, the management computer 300 displays information regarding the storage resource amount progress tabulation result information 3109 in graphs described later with reference to FIGS. 12 to 18. Accordingly, the administrative user can visually understand a situation of the computer system. The administrative user may change the configuration of the storage subsystem 100 according to the situation of the computer system thus understood.

Figure 12:
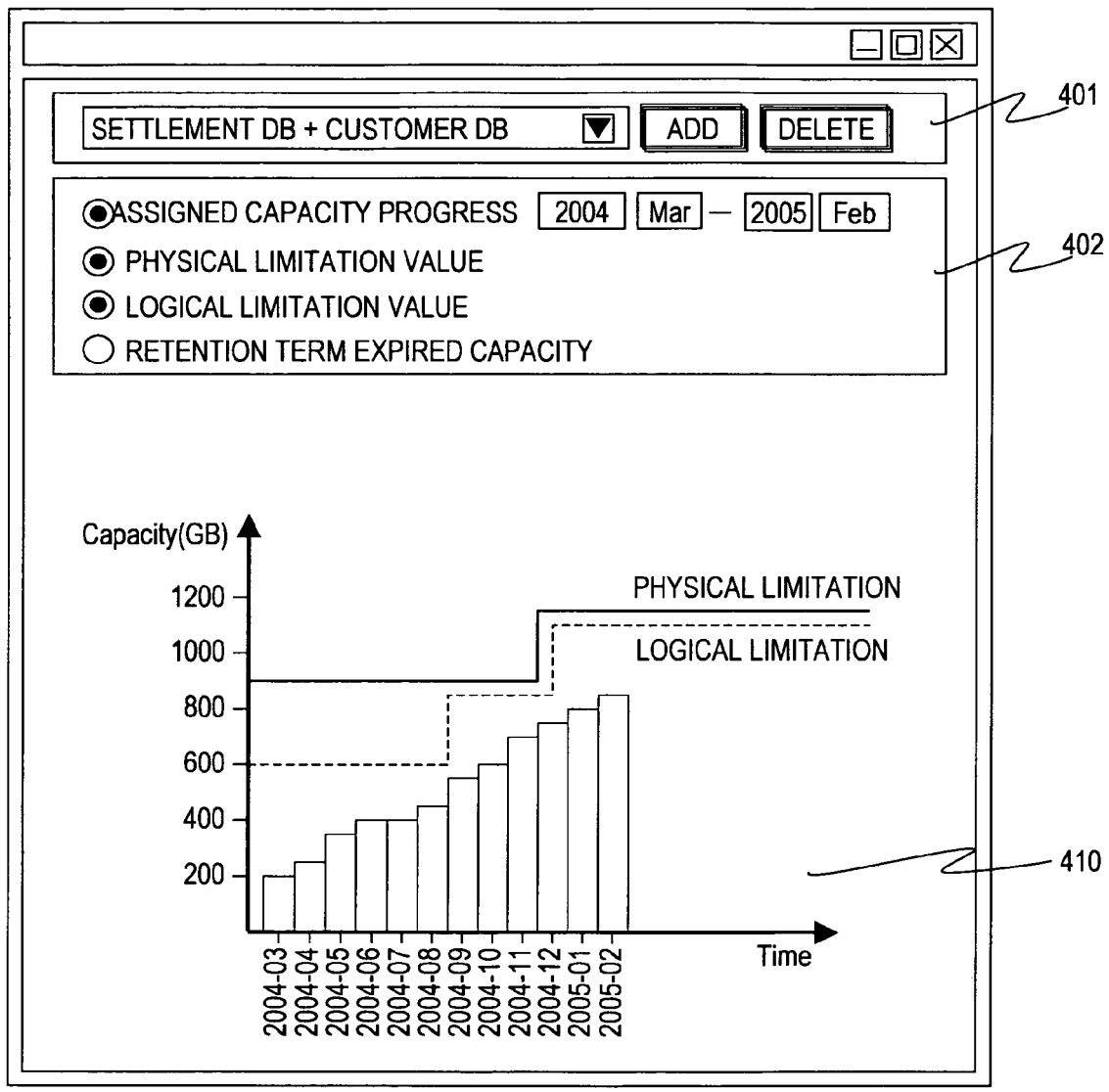
FIG. 12 is an explanatory diagram of a display screen of the management computer according to the first embodiment of this invention.

FIG. 12 is an explanatory diagram of a display screen of the management computer 300 according to the first embodiment of this invention.

The display screen of the management computer 300 includes an application host group selection unit 401, a display content designation unit 402, and a graph 410.

In the application host group selection unit 401, an application host group is selected by the administrative user. The management computer 300 displays a graph regarding the application host group selected in the application host group selection unit 401.

In the application host group selection unit 401, not only the application host group but also the host computer 200 or the storage subsystem 100 can be selected. When the host computer 200 or the storage subsystem 100 is selected, the management computer 300 displays the graph regarding the selected host computer 200 or storage subsystem 100.

In the display content designation unit 402, the user designates contents of a graph to be displayed. Specifically, in the display content designation unit 402, the user designates as to whether a graph regarding an assigned capacity a physical limitation value, a logical limitation value, and a retention term expired capacity is to be displayed or not.

In FIG. 12, switching is made between graph displaying and nondisplaying by a radio button of each item. Additionally, in the display content designation unit 402, the user designates a period to be covered by a graph regarding an assigned capacity.

Referring to FIG. 12, in the application host group selection unit 401, the group obtained by combining the application host group of the "settlement DB" and the application host group of the "customer DB" is selected.

In the display content designation unit 402, displaying of a graph regarding an assigned capacity, a physical limitation value, and a logical limitation value is designated. Further, in the display content designation unit 402, displaying of the graph regarding the assigned capacity from March of 2004 to February of 2005 is designated.

Then, the management computer 300 displays a graph 410.

Specifically, a record in which the "settlement DB" selected in the application host group selection unit 401 coincides with an application host group name 31022 of the application host group management information 3102 is selected from the application host group information 3102. Next, "Group_A" of the application host group identification information 31021 is extracted from the selected record.

Next, a record in which the "customer DB" selected in the application host group selection unit 401 coincides with the application host group name 31022 of the application host group management information 3102 is selected from the application host group management information 3102. Next, "Group_B" of the application host group information 31021 is extracted from the selected record.

Next, a record in which the "Group_A" and the "Group_B" of all the extracted application host group information 31021 coincide with the application host group identification information 31091 of the storage resource amount progress tabulation result information 3109 is selected from the storage resource amount progress tabulation result information 3109.

Next, information regarding contents designated in the display content designation unit 402 is extracted from the selected record. In this case, a physical limitation value 31095, a logical limitation value 31096, and an assigned capacity 31097 are extracted from the selected record. However, the assigned capacity 31097 regarding a period (March of 2004 to February of 2005) designated in the display content designation unit 402 is extracted.

Then, the physical limitation value 31095, the logical limitation value 31096, and the assigned capacity 31097 that have been extracted are displayed as a graph 410.

In other words, the management computer 300 displays a graph 410 regarding a group obtained by combining an application host group of "settlement DB" and an application host group of "customer DB". Accordingly, the administrative user can visually understand the situation of the computer system.

The management computer 300 may display a warning message when the assigned capacity 31097 exceeds the physical limitation value 31095 and/or the logical limitation value 31096.

Figure 13:
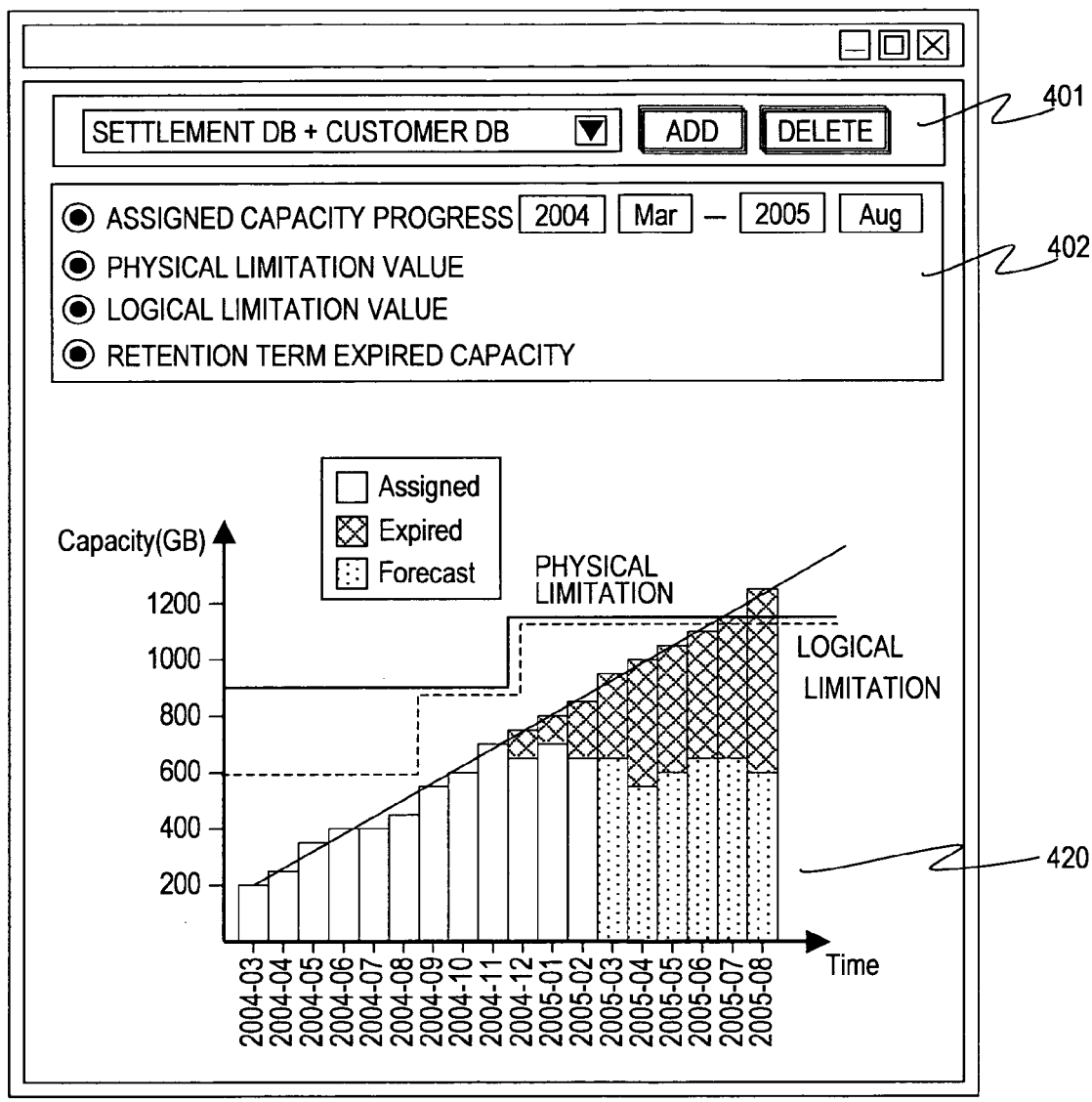
FIG. 13 is an explanatory diagram of the display screen of the management computer according to the first embodiment of this invention.

FIG. 13 is an explanatory diagram of the display screen of the management computer 300 according to the first embodiment of this invention.

Referring to FIG. 13, in the application host group selection unit 401, the group obtained by combining the application host group of the "settlement DB" and the application host group of the "customer DB" is selected.

In the display content designation unit 402, displaying of a graph regarding an assigned capacity, a physical limitation value, a logical limitation value and a retention term expired capacity is designated. Further, in the display content designation unit 402, displaying of the graph regarding the assigned capacity from March of 2004 to August of 2005 is designated.

Then, the management computer 300 displays a graph 420.

Specifically, a record in which the "settlement DB" selected in the application host group selection unit 401 coincides with an application host group name 31022 of the application host group management information 3102 is selected from the application host group information 3102. Next, "Group_A" of the application host group identification information 31021 is extracted from the selected record.

Next, a record in which the "customer DB" selected in the application host group selection unit 401 coincides with the application host group name 31022 of the application host group management information 3102 is selected from the application host group management information 3102. Next, "Group_B" of the application host group information 31021 is extracted from the selected record.

Next, a record in which the "Group_A" and the "Group_B" of all the extracted application host group information 31021 coincide with the application host group identification information 31091 of the storage resource amount progress tabulation result information 3109 is selected from the storage resource amount progress tabulation result information 3109.

Next, information regarding contents designated in the display content designation unit 402 is extracted from the selected record. In this case, a physical limitation value 31095, a logical limitation value 31096, an assigned capacity 31097, and a retention term expired capacity 31098 are extracted from the selected record. The assigned capacity 31097 regarding a period (from March of 2004 to August of 2005) designated in the display content designation unit 402 is extracted. However, as no value is stored in a future (from March of 2005 to August of 2005) assigned capacity 31097, the management computer 300 can only extract the assigned capacity 31097 up to a present time (from March of 2004 to February of 2005).

Thus, a future assigned capacity is forecast based on the extracted assigned capacity 31097 up to the present time. In this case, the future assigned capacity is forecast by using a forecast function. For example, the forecast function is a linear forecast function or the like.

Then, the physical limitation value 31095, the logical limitation value 31096, the assigned capacity 31097, and the retention term expired capacity 31098 that have been extracted are displayed as a graph 420. Further, the forecast future assigned capacity is displayed as the graph 420. The management computer 300 may display the retention term expired capacity by a different color on a bar graph of the assigned capacity as in the case of the graph 420.

As described above, the management computer 300 can forecast and display the future assigned capacity. Thus, the administrative user can easily forecast when the assigned capacity will exceed the physical limitation value and/or the logical limitation value. In other words, the administrative user can forecast a shortage of the storage extent 120 assigned to the application host group. Then, before the storage extent 120 becomes insufficient, the administrative user can take countermeasures against the shortage by adding a new storage subsystem 100 or a storage extent 120 to the storage resource pool, or the like.

The management computer 300 may display a warning message when the forecast future assigned capacity exceeds the physical limitation value 31095 and/or the logical limitation value 31096.

The management computer 300 can display the retention term expired capacity. Accordingly, the administrative user can easily understand a retention term expired capacity of data. The administrative user can instruct the storage subsystem 100 to delete the retention term expired data. Then, the storage subsystem 100 deletes the data, whereby use efficiency of the storage extent 120 can be increased.

Figure 14:
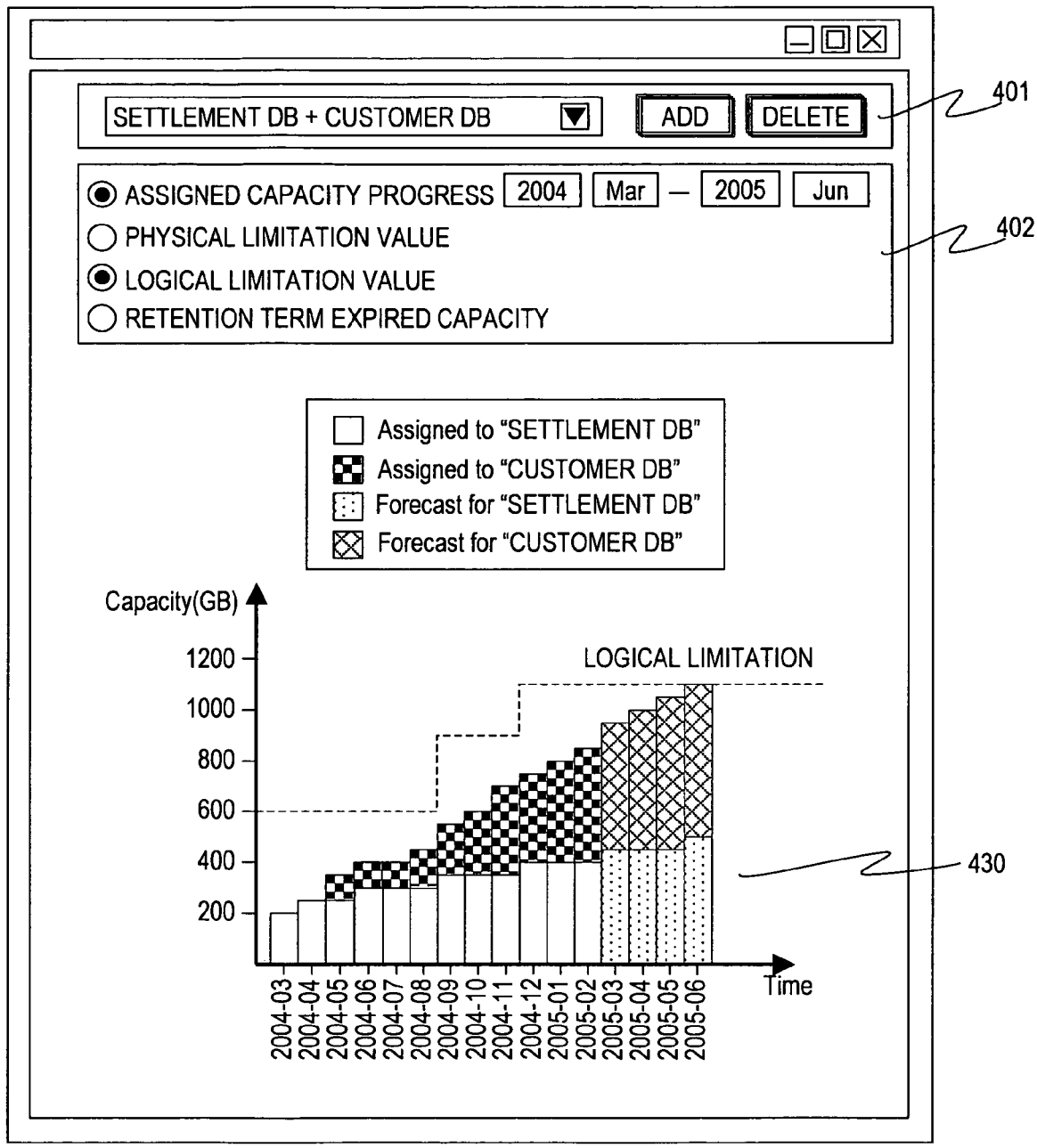
FIG. 14 is an explanatory diagram of the display screen of the management computer according to the first embodiment of this invention.

FIG. 14 is an explanatory diagram of the display screen of the management computer 300 according to the first embodiment of this invention.

Referring to FIG. 14, in the application host group selection unit 401, the group obtained by combining the application host group of the "settlement DB" and the application host group of the "customer DB" is selected.

In the display content designation unit 402, displaying of a graph regarding an assigned capacity and a logical limitation value is designated. Further, in the display content designation unit 402, displaying of the graph regarding the assigned capacity from March of 2004 to August of 2005 is designated.

Then, the management computer 300 displays a graph 420.

Specifically, a record in which the "settlement DB" selected in the application host group selection unit 401 coincides with an application host group name 31022 of the application host group management information 3102 is selected from the application host group information 3102. Next, "Group_A" of the application host group identification information 31021 is extracted from the selected record.

Next, a record in which the "customer DB" selected in the application host group selection unit 401 coincides with the application host group name 31022 of the application host group management information 3102 is selected from the application host group management information 3102. Next, "Group_B" of the application host group information 31021 is extracted from the selected record.

Next, a record in which the "Group_A" and the "Group_B" of all the extracted application host group information 31021 coincide with the application host group identification information 31091 of the storage resource amount progress tabulation result information 3109 is selected from the storage resource amount progress tabulation result information 3109.

Next, information regarding contents designated in the display content designation unit 402 is extracted from the selected record. In this case, a logical limitation value 31096 and an assigned capacity 31097 are extracted from the selected record. The assigned capacity 31097 regarding a period "from March of 2004 to June of 2005" designated in the display content designation unit 402 is extracted. However, as no value is stored in a future (from March of 2005 to June of 2005) assigned capacity 31097, the management computer 300 can only extract the assigned capacity 31097 up to a present time (from March of 2004 to February of 2005).

Thus, a future assigned capacity is forecast based on the extracted assigned capacity 31097 up to the present time.

Accordingly, an assigned capacity of a group obtained by combining "Group_A" and "Group_B" is obtained.

Next, a record in which the extracted "Group_A" of the application host group identification information 31021 coincides with the application host group identification information 31091 of the storage resource amount progress tabulation result information 3109 is selected from the storage resource amount progress tabulation result information 3109.

Next, an assigned capacity 31097 is extracted from the selected record. Next, a future assigned capacity is forecast based on the extracted assigned capacity 31097.

Accordingly, an assigned capacity of the application host group of the "Group_A" is obtained.

Then, the logical limitation value 31096 and the assigned capacity 31097 that have been extracted are displayed as a graph 430. Further, the forecast future assigned capacity is displayed as the graph 430.

In this case, the graph of the assigned capacity of the application host group of the "Group_A (settlement DB)" is displayed to be superimposed on the graph of the assigned capacity of the group obtained by combining the "Group_A (settlement DB)" and the "Group_B (customer DB)". Then, an assigned capacity of each application host group can be displayed. Thus, the administrative user can visually understand the assigned capacity of each application host group.

Figure 15:
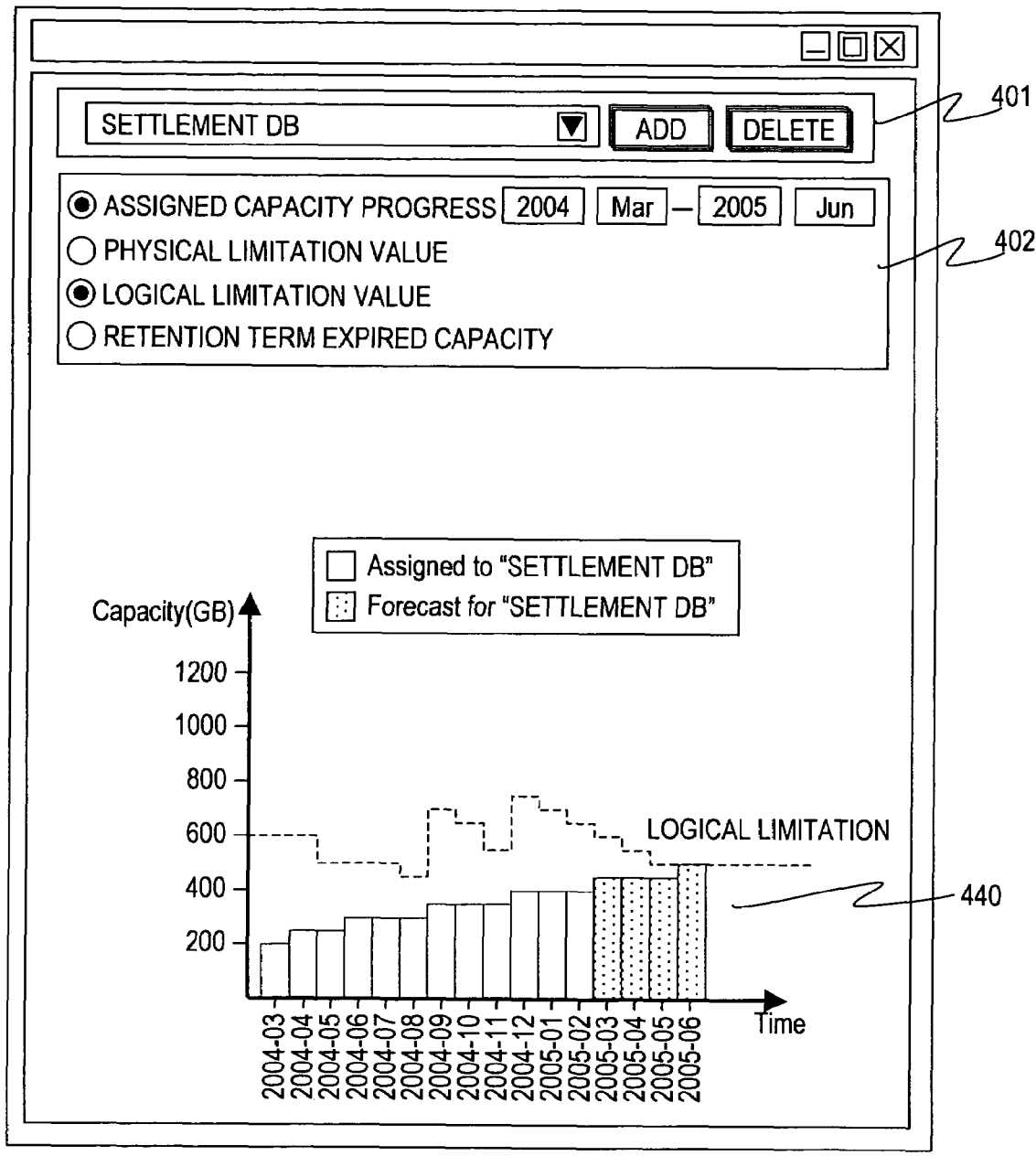
FIG. 15 is an explanatory diagram of the display screen of the management computer according to the first embodiment of this invention.

FIG. 15 is an explanatory diagram of the display screen of the management computer 300 according to the first embodiment of this invention.

As shown in FIG. 15, in the application host group selection unit 401, an application host group of a "customer DB" is selected.

In the display content designation unit 402, displaying of a graph regarding an assigned capacity and a logical limitation value is designated. Further, in the display content designation unit 402, displaying of a graph regarding an assigned capacity from March of 2004 to June of 2005 is designated.

Then, the management computer 300 displays a graph 440.

Specifically, the information extracted by the processing described above with reference to FIG. 14 is used. The assigned capacity of the application host group of the "Group_A (settlement DB)" is subtracted from the assigned capacity of the group obtained by combining the "Group_A (settlement DB)" and the "Group_B (customer DB)". Accordingly, an assigned capacity regarding an application host group of the "Group_B (customer DB)" is obtained.

Similarly, a logical limitation value regarding the application host group of the "Group_A (settlement DB)" is subtracted from logical limitation values of the application host group of the "Group_A (settlement DB)" and the "Group_B (customer DB)". Accordingly, a logical limitation value regarding the application host group of the "Group_B (customer DB)" is obtained.

Then, the assigned capacity and the logical limitation value that have been obtained are displayed as a graph 440. Thus, the administrative user can visually understand an influence on the logical limitation value set in the group obtained by combining a plurality of application host groups in one application host group.

Figure 16:
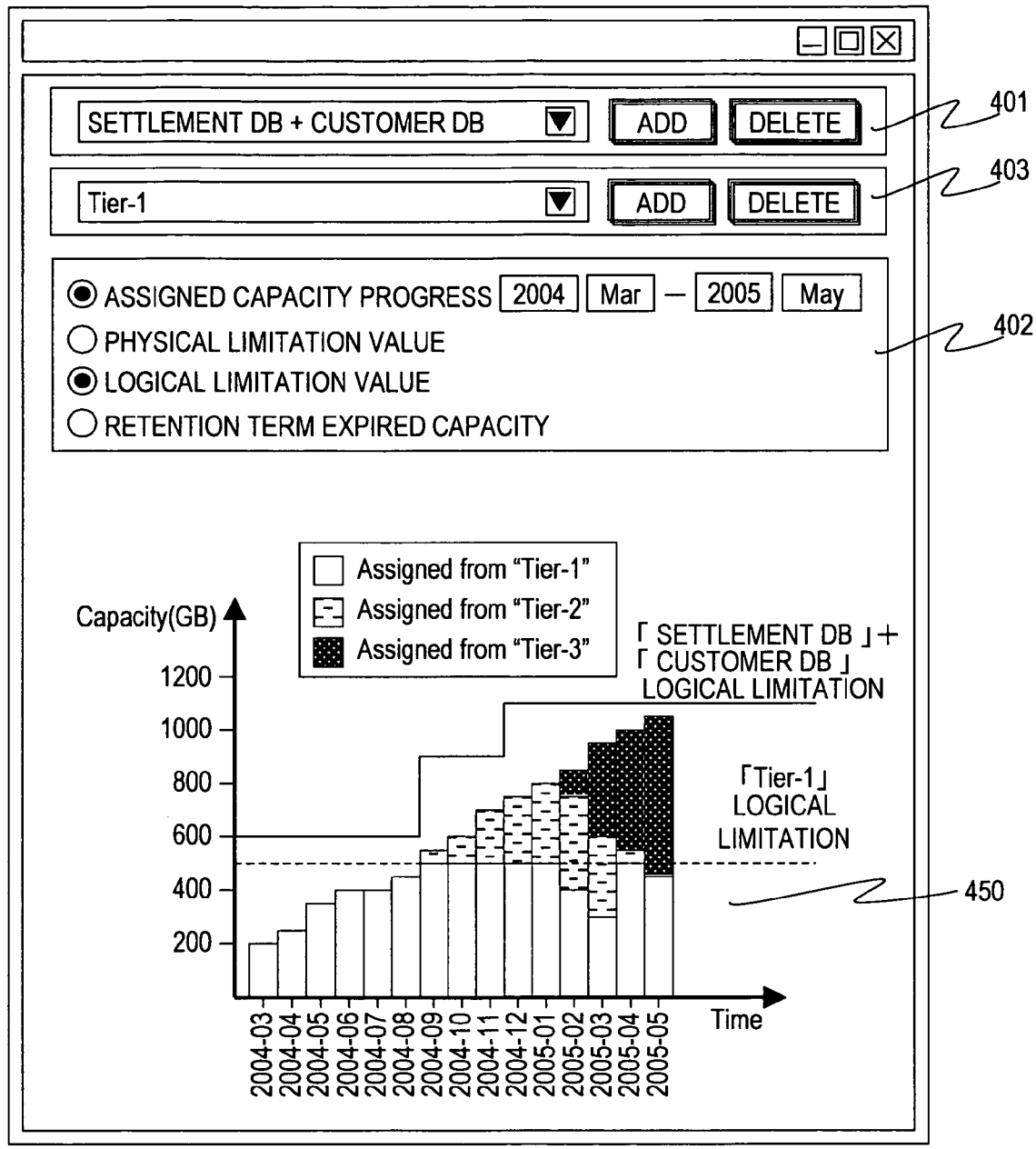
FIG. 16 is an explanatory diagram of the display screen of the management computer according to the first embodiment of this invention.

FIG. 16 is an explanatory diagram of the display screen of the management computer 300 according to the first embodiment of this invention.

The display screen of the management computer 300 includes an application host group selection unit 401, a storage resource selection unit 403, a display content designation unit 402, and a graph 450.

The application host group selection unit 401 and the display content designation unit 402 are similar to those included in the display screen described above with reference to FIG. 12. Thus, description thereof will be omitted.

In the storage resource selection unit 403, a storage resource pool is selected by the administrative user. The management computer 300 displays a graph based on the storage resource pool selected in the storage resource selection unit 403.

As shown in FIG. 16, in the application host group selection unit 401, a group obtained by combining an application host group of a "settlement DB" and an application host group of a "customer DB" is selected.

In the display content designation unit 402, displaying of a graph regarding an assigned capacity and a logical limitation value is designated. Further, in the display content designation unit 402, displaying of a graph regarding an assigned amount from March of 2004 to May of 2005 is designated.

In the application host group selection unit 403, a storage resource pool of "Tier-1" is selected.

Then, the management computer 300 displays a graph 450.

Specifically, a record in which the "settlement DB" selected in the application host group selection unit 401 coincides with an application host group name 31022 of the application host group management information 3102 is selected from the application host group information 3102. Next, "Group_A" of the application host group identification information 31021 is extracted from the selected record.

Next, a record in which the "customer DB" selected in the application host group selection unit 401 coincides with the application host group name 31022 of the application host group management information 3102 is selected from the application host group management information 3102. Next, "Group_B" of the application host group information 31021 is extracted from the selected record.

Next, a record in which the "Group_A" and the "Group_B" of all the extracted application host group information 31021 coincide with the application host group identification information 31091 of the storage resource amount progress tabulation result information 3109 is selected from the storage resource amount progress tabulation result information 3109.

Next, information regarding the contents designated in the display content designation unit 402 is extracted from the selected record. In this case, an assigned capacity 31097 of each storage resource pool is extracted from the selected record. Further, a logical limitation value 31096 regarding the storage resource pool of "Tier-1" selected in the storage resource selection unit 403 is extracted from the selected record.

Then, the assigned capacity 31097 and the logical limitation value 31096 that have been extracted are displayed as a graph 450. In this case, the graph 450 is displayed such that the assigned capacity 31097 of the storage resource pool of the "Tier-1" selected in the storage resource selection unit 403 is at a lowermost stage of the bar graph. Thus, the administrative user can visually understand the assigned capacity and the logical limitation value of each storage resource pool.

Figure 17:
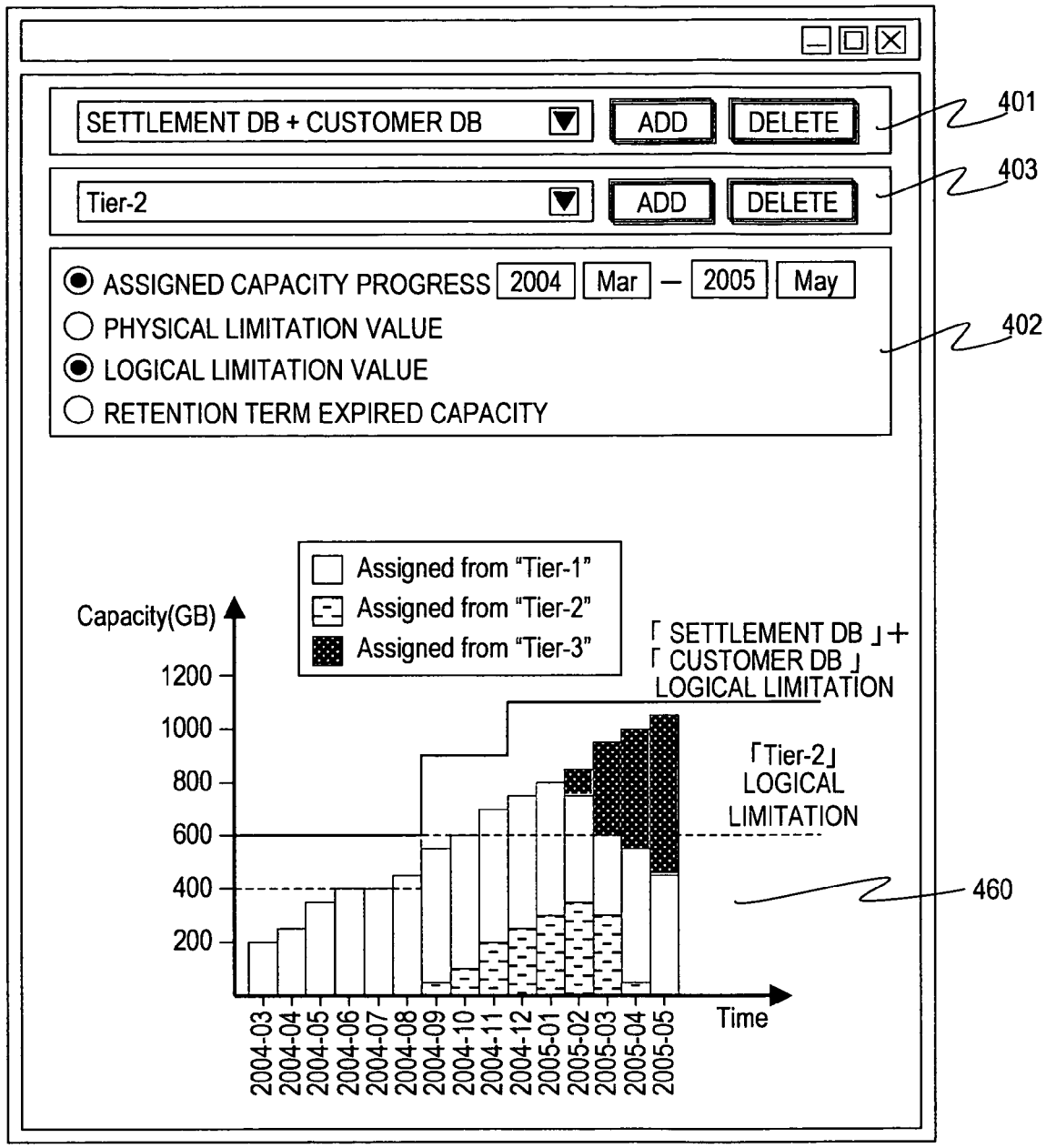
FIG. 17 is an explanatory diagram of the display screen of the management computer according to the first embodiment of this invention.

FIG. 17 is an explanatory diagram of the display screen of the management computer 300 according to the first embodiment of this invention.

Referring to FIG. 17, in the application host group selection unit 403, a storage resource pool of "Tier-2" is selected. In the application host group selection unit 401 and the display content designation unit 402, the same display screen as that described above with reference to FIG. 16 is selected.

Then, the management computer 300 displays a graph 460.

The management computer 300 displays the graph 460 such that an assigned capacity 31097 of the storage resource pool of "Tier-2" selected in the storage resource selection unit 403 is at a lowermost stage of the bar graph. Other processing operations are similar to those described above with reference to FIG. 16. Thus, description thereof will be omitted.

Next, processing of the computer system when a data retention term is changed will be described.

Figure 18:
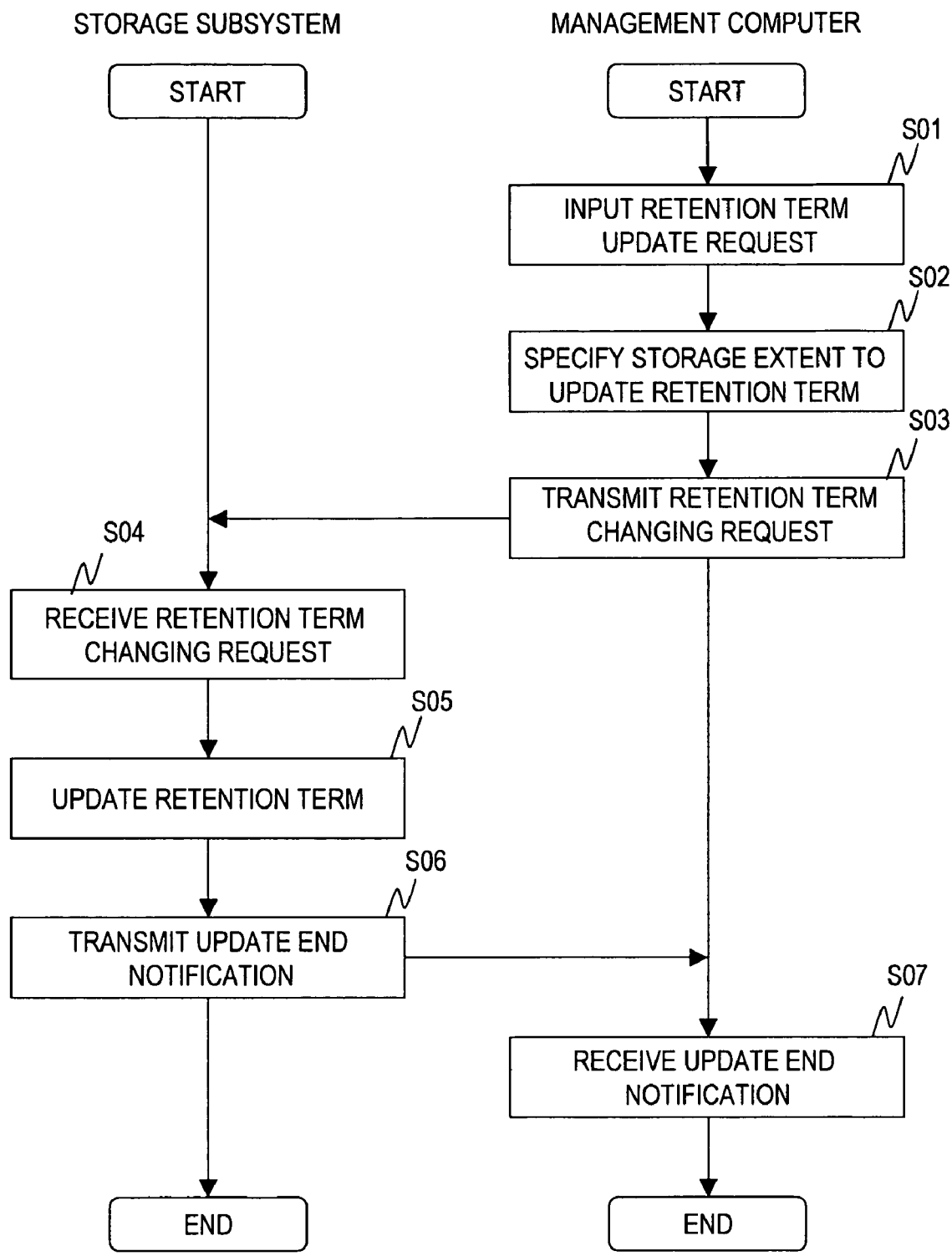
FIG. 18 is a flowchart of retention term update processing of the computer system according to the first embodiment of this invention.

FIG. 18 is a flowchart of retention term update processing of the computer system according to the first embodiment of this invention.

First, the administrative user inputs a retention term update request to the management computer 300 (S01). The retention term update request contains identification information of an application host group whose retention term is to be changed, a retention term after updating, or the like.

The management computer 300 extracts the identification information of the application host group and the retention term after the updating from the input retention term update request. Next, a record in which the extracted identification information of the application host group coincides with the application host group identification information 31021 of the application host group management information 3102 is selected from the application host group management information 3102. Next, the updated retention term extracted from the retention term update information is stored in a retention term 31024 of the selected record.

Next, a record in which the identification information of the application host group extracted from the retention term update request coincides with the application host group identification information 31017 of the storage extent configuration management information 3101 is selected from the storage extent configuration management information 3101. Next, storage subsystem identification information 31011 and storage extent identification information 31013 are extracted from the selected record. Accordingly, a storage extent 120 whose retention term is to be updated is specified (S02).

Next, the retention term changing request is transmitted to a storage subsystem 100 corresponding to the extracted storage subsystem identification information 3101 (S03). The retention term changing request contains the extracted storage extent identification information 31013, the extracted updated retention term, or the like.

The storage subsystem 100 receives the retention term changing request from the management computer 300 (S04). Then the storage subsystem 100 extracts the storage extent identification information 31013 and the updated retention term from the received retention term changing information. Next, a record in which the extracted storage extent identification information coincides with the storage extent identification information 11023 of the storage extent configuration information 1102 is selected from the storage extent configuration information 1102. Next, the updated retention term extracted from the retention term changing information is stored in a retention term 11027 of the selected record. Accordingly, the retention term of the storage extent is updated (S05).

Then, an update end notification is sent to the management computer 300 (S06).

Then, the management computer 300 receives the update end notification from the storage subsystem 100 (S07). Next, a retention term expired capacity 31098 of the storage resource amount progress tabulation result information 3109 is updated.

Specifically, a changing period of the retention term is calculated by subtracting the retention term before the updating from the updated retention term. Then, a value stored in the retention term expired capacity 31098 is moved by the number of columns corresponding to the calculated changing period.

For example, it is presumed that the retention term is extended by three months. In this case, the value stored in the retention term expired capacity 31098 is moved by three columns to the right. Specifically, the retention term expired capacity 31098 of March of 2005 is moved to a retention term expired capacity 31098 of June of 2005.

Accordingly, the retention term expired capacity 31098 of the storage resource amount progress tabulation result information 3109 is updated. Then, the retention term update processing is finished.

It should be noted that the management computer 300 may calculate the retention term expired capacity 31098 again as in the case of the method described above with reference to FIG. 11.

Figure 19:
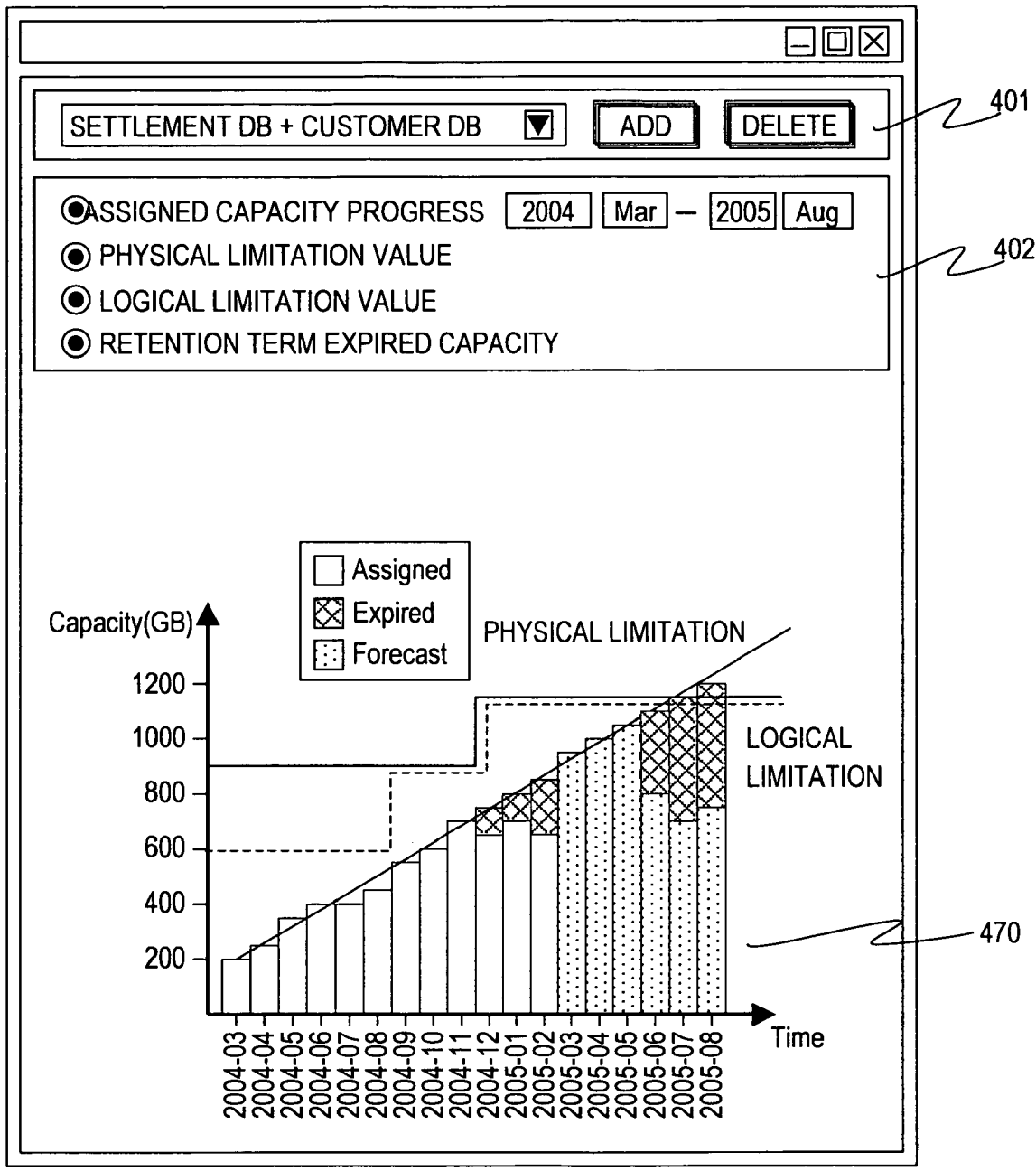
FIG. 19 is an explanatory diagram of the display screen of the management computer according to the first embodiment of this invention.

FIG. 19 is an explanatory diagram of the display screen of the management computer 300 according to the first embodiment of this invention.

The display screen of the management computer 300 includes an application host group selection unit 401, a display content designation unit 402, and a graph 470. The application host group selection unit 401 and the display content designation unit 402 are similar in configuration to those included in the display screen described above with reference to FIG. 12. Thus, description thereof will be omitted.

In this case, the shown display screen corresponds to the display screen described above with reference to FIG. 13. FIG. 19 shows the display screen after the retention term updating, while FIG. 13 shows the display screen before the retention term updating.

In the graph 470 shown in FIG. 19, as compared with the graph 420 before the retention term updating shown in FIG. 13, a portion regarding a retention term expired capacity is moved behind by three months. Other portions of the graph 470 are similar to those of the graph 420 before the retention term updating.

Thus, the management computer 300 can easily change the retention term.

Before actual changing of the retention term, the management computer 300 may execute after-retention-term-update simulation to display its result. Accordingly, the administrative user can reduce setting mistakes of the computer system.

Second Embodiment

According to a second embodiment of this invention, a storage extent 120 is managed by a virtual storage extent unit.

A configuration of a computer system according to the second embodiment of this invention is similar to that of the computer system of the first embodiment shown in FIG. 1. Thus, description thereof will be omitted.

Figure 20:
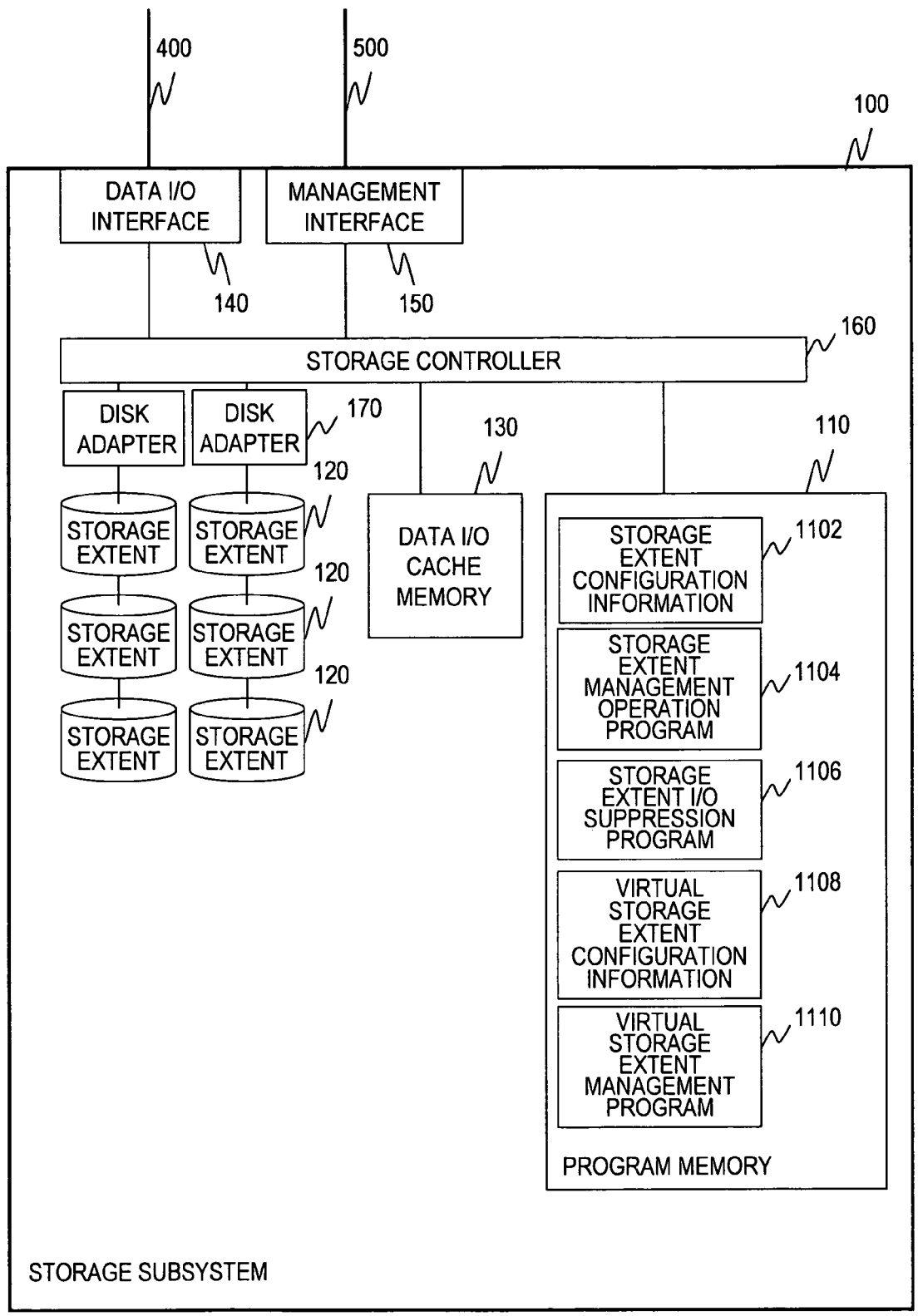
FIG. 20 is a block diagram of a storage subsystem according to a second embodiment of this invention.

FIG. 20 is a block diagram of a storage subsystem 100 according to the second embodiment of this invention.

The storage subsystem 100 of the second embodiment is similar to that of the first embodiment shown in FIG. 2 except for information stored in a memory 110. Similar components are denoted by similar reference numerals, and description thereof will be omitted.

The memory 110 stores storage extent configuration information 1102, a storage extent management operation program 1104, a storage extent I/O suppression program 1106, a virtual storage extent configuration information 1108, and a virtual storage extent management program 1110.

The storage extent configuration information 1102, the storage extent management operation program 1104, and the storage extent I/O suppression program 1106 are similar to those stored in the storage subsystem of the first embodiment shown in FIG. 2. Thus, description thereof will be omitted.

The virtual extent configuration information 1108 regards a correspondence between a virtual storage extent and a storage resource pool as described later with reference to FIG. 24. The virtual storage extent management program 1110 manages a storage extent 120 as a virtual storage extent as described later with reference to FIG. 21.

Figure 21:
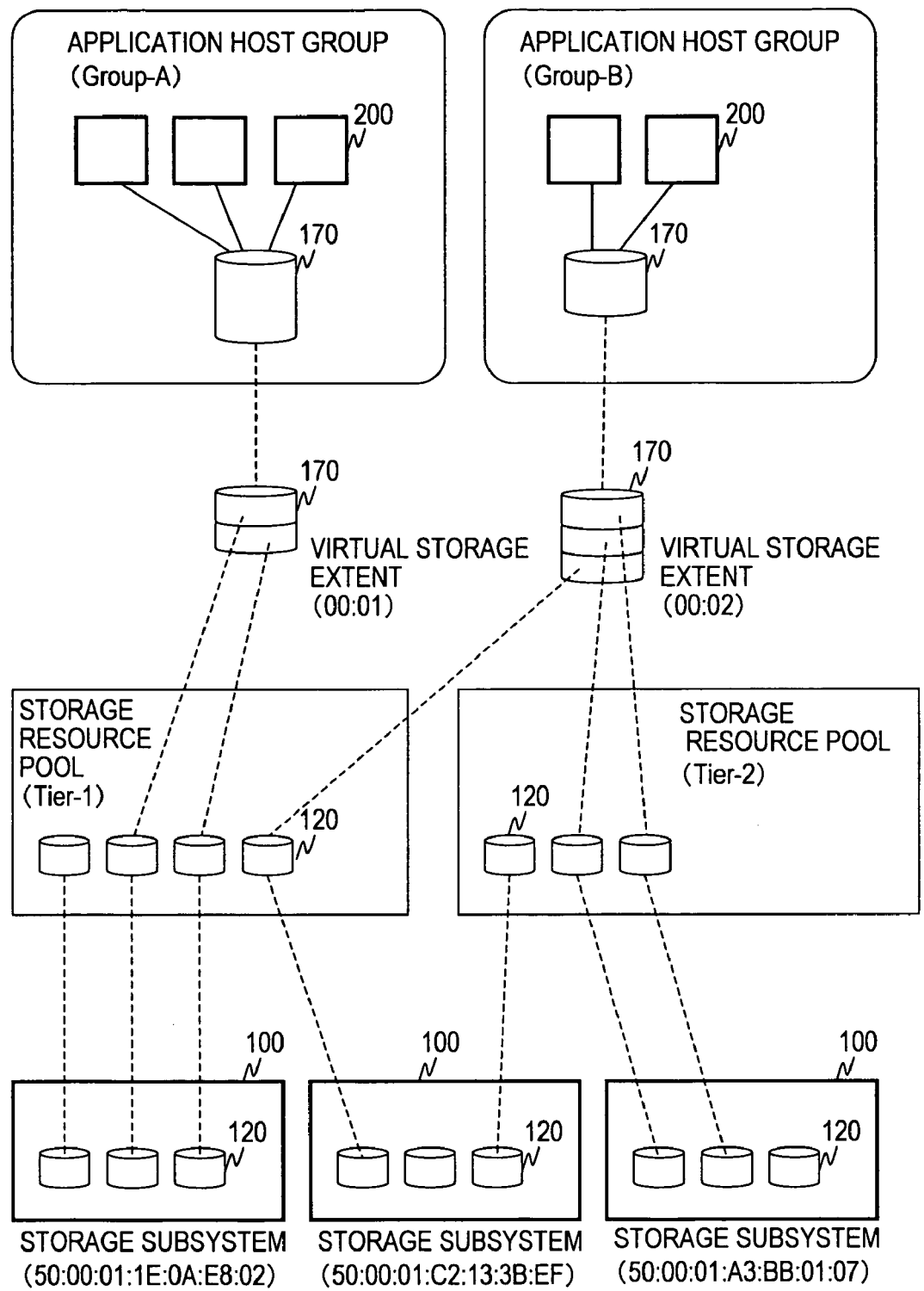
FIG. 21 is an explanatory diagram of a storage extent of the storage subsystem according to the second embodiment of this invention.

FIG. 21 is an explanatory diagram of the storage extent 120 of the storage subsystem 100 according to the second embodiment of this invention.

The storage extent 120 of the storage subsystem 100 belongs to one of the storage resource pools. The storage resource pools are logical configuration units to largely classify the storage extents 120.

Further, according to the embodiment, a virtual storage extent 170 is defined. The virtual storage extent 170 is a large storage extent which contains one or more storage extents 120.

A storage resource pool is assigned to the virtual storage extent 170. A plurality of storage resource pools may be assigned to one virtual storage extent 170. One storage resource pool may be assigned to a plurality of virtual storage extents.

Further, the storage extent 120 is assigned to the virtual storage extent 170. Specifically, the storage extent 120 included in the storage resource pool assigned to the virtual storage extent 170 is assigned to the virtual storage extent 170. The virtual storage extent 170 becomes a storage extent which contains the storage extent 120 assigned to itself.

The virtual storage extent 170 is assigned to an application host group. A host computer 200 belonging to the application host group inputs/outputs data to/from the virtual storage extent 170. According to this embodiment, the application host groups and the virtual storage extents 170 corresponds to each other on a one-to-one basis. However, the application host groups and the virtual storage extents 170 do not necessarily correspond to each other on a one-to-one basis.

Figure 22:
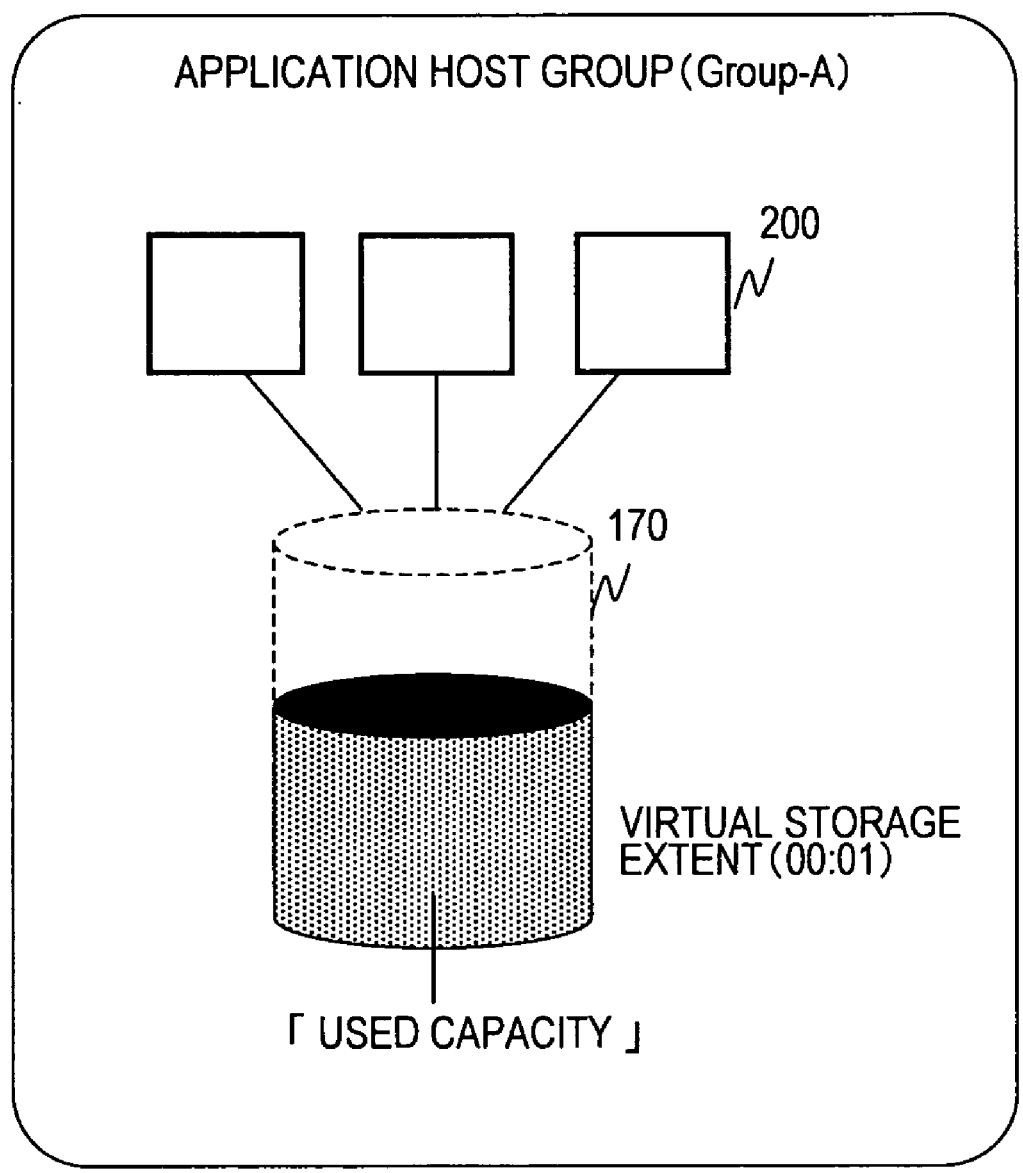
FIG. 22 is an explanatory diagram of a virtual storage extent according to the second embodiment of this invention.

FIG. 22 is an explanatory diagram of the virtual storage extent 170 according to the second embodiment of this invention.

The host computer 200 belonging to the application host group inputs/outputs data to/from the virtual storage extent 170 assigned to the application host group.

In this case, it is presumed that a capacity of data stored in the virtual storage extent 170 is a used capacity of the virtual storage extent 170.

Figure 23:
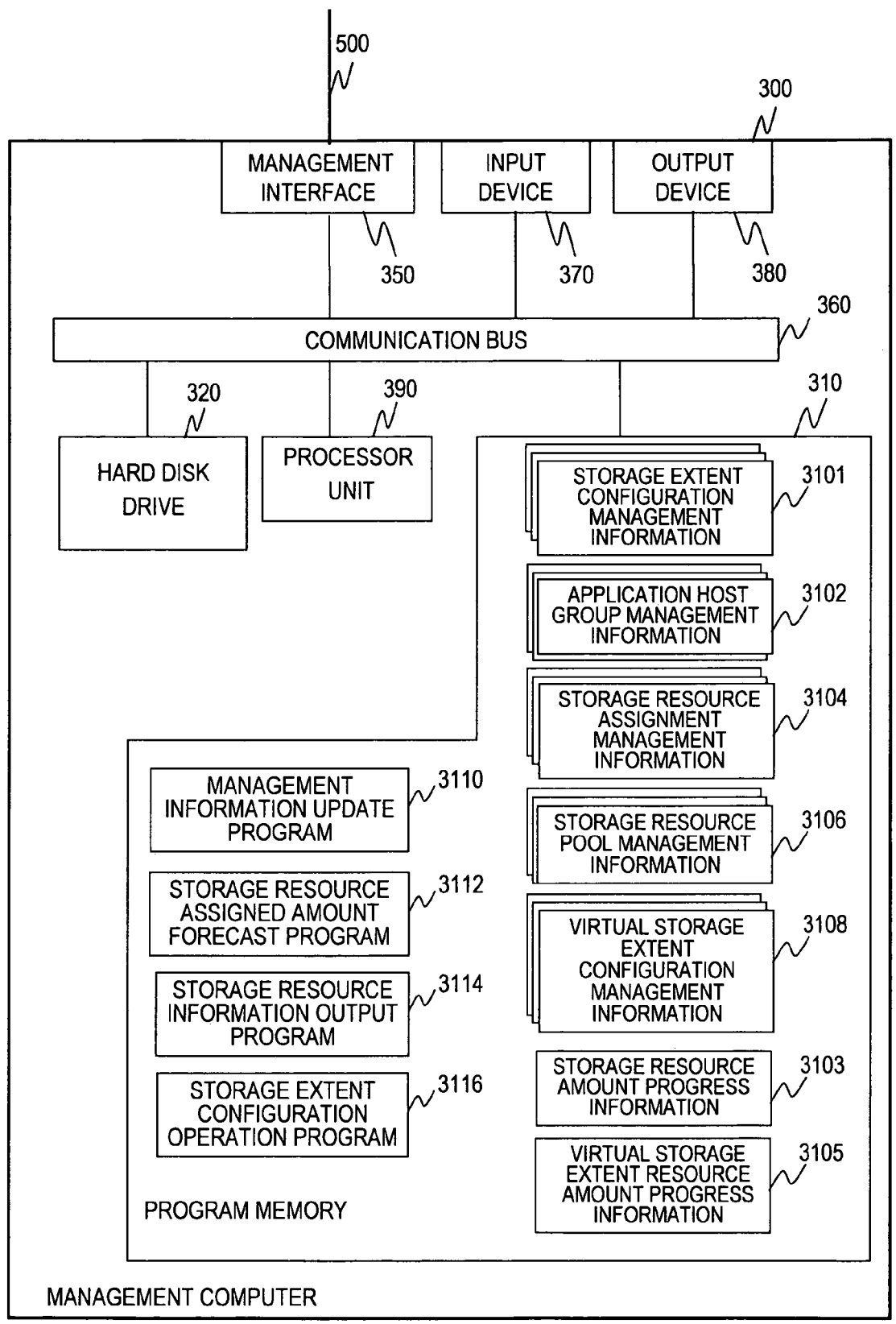
FIG. 23 shows a configuration of management computer according to the second embodiment of this invention.

FIG. 23 shows a configuration of a management computer 300 according to the second embodiment of this invention.

The management computer 300 is similar to that of the first embodiment shown in FIG. 5 except for information stored in a memory 310. Similar components are denoted by similar reference numerals, and description thereof will be omitted.

The memory 310 stores storage extent configuration management information 3101, application host group management information 3102, storage resource assignment management information 3104, storage resource pool management information 3106, a management information update program 3110, a storage resource assigned amount forecast program 3112, a storage resource information output program 3114, a storage extent configuration operation program 3116, virtual storage extent configuration management information 3108, storage resource amount progress information 3103, and virtual storage extent resource amount progress information 3105.

The storage extent configuration management information 3101, the application host group management information 3102, the storage resource assignment management information 3104, the storage resource pool management information 3106, the management information update program 3110, the storage resource assigned amount forecast program 3112, the storage resource information output program 3114, and the storage extent configuration operation program 3116 are similar to those stored in the management computer of the first embodiment shown in FIG. 5.

The virtual storage extent configuration management information 3108 regards a correspondence between a virtual storage extent and a storage resource pool as described later with reference to FIG. 25. The storage resource amount progress information 3103 regards a storage resource pool as described later with reference to FIG. 26. The virtual storage extent resource amount progress information 3105 is a progress of information regarding the virtual storage extent as described later with reference to FIG. 27.

Figure 24:
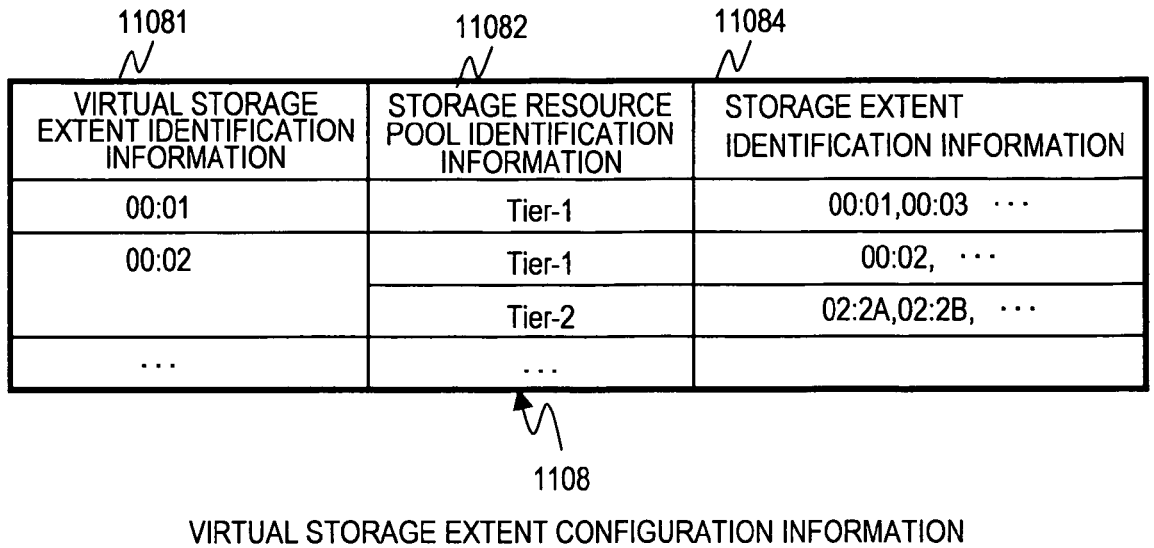
FIG. 24 shows a configuration of virtual storage extent configuration information of the storage subsystem according to the second embodiment of this invention.

FIG. 24 shows a configuration of the virtual storage extent configuration information 1108 of the storage subsystem 100 according to the second embodiment of this invention.

The storage subsystems 100 each store virtual storage extent configuration information 1108. FIG. 24 shows storage extent configuration information 1102 stored by the storage subsystem 100 whose storage subsystem identification information is "50:00:01:1E:0A:E8:02".

The virtual storage extent configuration information 1108 contains virtual storage extent identification information 11081, storage resource pool identification information 11082, and storage extent identification information 11084.

The virtual storage extent identification information 11081 is a unique identifier of the virtual storage extent 170. The storage resource pool identification information 11082 is a unique identifier of a storage resource belonging to the virtual storage extent 170. The storage extent identification information 11084 is a unique identifier of a storage extent 120 belonging to the virtual storage extent 170.

Figure 25:
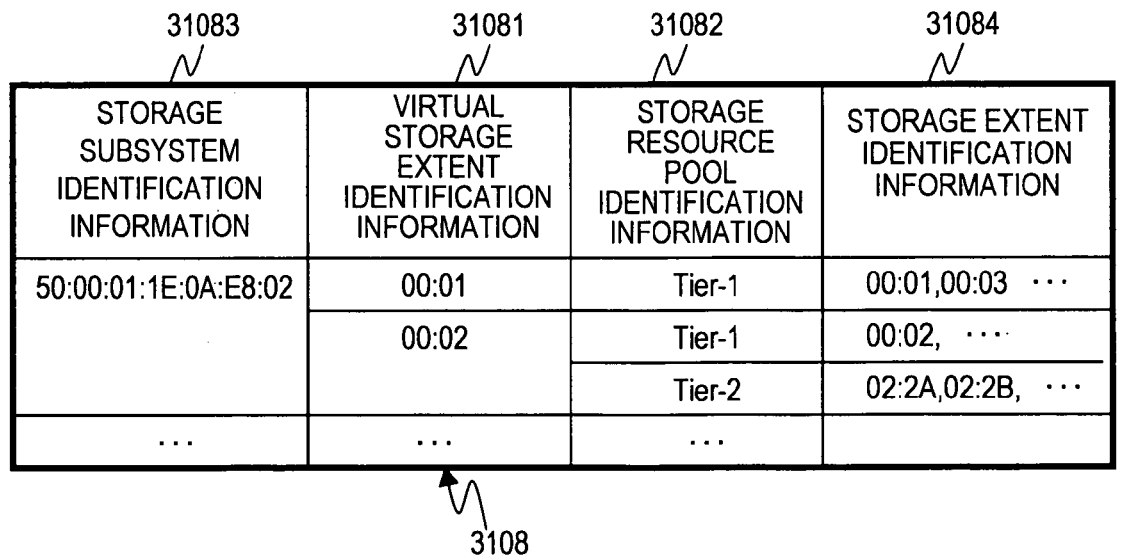
FIG. 25 shows a configuration of virtual storage extent configuration management information of the management computer according to the second embodiment of this invention.

FIG. 25 shows a configuration of the virtual storage extent configuration management information 3108 of the management computer 300 according to the second embodiment of this invention.

The virtual storage extent configuration management information 3108 contains storage subsystem identification information 31083, virtual storage extent identification information 31081, storage resource pool identification information 31082, and storage extent identification information 31084.

The storage subsystem identification information 31083 is a unique identifier of the storage subsystem 100. As shown, the storage subsystem identification information 31083 is WWN of the storage subsystem 100.

The virtual storage extent identification information 31081 is a unique identifier of the virtual storage extent 170. The storage resource pool identification information 31082 is a unique identifier of a storage resource pool belonging to the virtual storage extent. The storage extent identification information 31084 is a unique identifier of the storage extent 120 belonging to the virtual storage extent 170.

The management information update program 3110 obtains virtual storage extent configuration information 1108 from all the storage subsystems 100. Then, new virtual storage extent configuration management information 3108 is created based on the obtained virtual storage extent configuration information 1108.

Specifically, the management information update program 3110 stores an identifier of each of the storage subsystems 100 from which the virtual storage extent configuration information 1108 has been obtained in the storage subsystem identification information 31083 of the virtual storage extent configuration management information 3108.

Next, the obtained virtual storage extent identification information 11081 of the virtual storage extent configuration information 1108 is stored in the virtual storage extent identification information 31081 of the virtual storage extent configuration management information 3108. Next, the obtained storage resource pool identification information 11082 of the virtual storage extent configuration management information 3108 is stored in the storage resource pool identification information 11082 of the virtual storage extent configuration management information 3108. Next, the obtained storage extent identification information 11084 of the virtual storage extent configuration information 1108 is stored in the storage extent identification information 31084 of the virtual storage extent configuration management information 3108.

Thus, the management information update program 3110 creates the virtual storage extent configuration management information 3108.

FIG. 26 shows a configuration of the storage resource amount progress information 3103 of the management computer 300 according to the second embodiment of this invention.

The storage resource amount progress information 3103 contains storage resource pool identification information 31039 and storage resource configuration progress information 31033.

The storage resource pool identification information 31039 is a unique identifier of a storage resource pool.

The storage resource configuration progress information 31033 is a progress of various pieces of information regarding the storage resource pool, and contains a physical limitation value 31035, a logical limitation value 31036, and an assigned capacity 31037.

The physical limitation value 31035 is a sum total of capacities of storage extents 120 included in the storage resource pool. In other words, the physical limitation value 31035 is a sum total of storage extents 120 physically assignable to the virtual storage extent 170 from the storage resource pool.

The logical limitation value 31036 is a logical limitation value of a sum total of capacities of storage extents 120 assigned to the virtual storage extent 170 from the storage resource pool. The logical limitation value 31036 is a value set by the administrative user.

The assigned capacity 31037 is a sum total of capacities of storage extents 120 actually assigned to the virtual storage extent 170 from the storage resource pool.

The management information update program 3110 updates the storage resource amount progress information 3103 based on the storage extent configuration management information 3101 shown in FIG. 7, the storage resource pool management information 3106 shown in FIG. 10, and the virtual storage extent configuration management information 3108 shown in FIG. 25. For example, the management information update program 3110 adds information to the storage resource amount progress information 3103 at a predetermined interval (e.g., once a month).

Specifically, the management information update program 3110 selects a record in which storage resource pool identification information 31039 of a record to update data coincides with the storage resource pool identification information 31061 from the storage resource pool management information 3106. Next, storage subsystem identification information 31063 and storage extent identification information 31064 are extracted from the selected record.

Next, a record in which the extracted storage subsystem identification information 31063 coincides with the storage subsystem identification information 31011 of the storage extent configuration management information 3101, and the extracted storage extent identification information 31064 coincides with the storage extent identification information 31013 of the storage extent configuration management information 3101 is selected from the storage extent configuration information 3101. Next, storage capacities 31014 are extracted from the selected record.

Next, a sum total of the extracted storage capacities 31014 is calculated. Then, the calculated sum total of the storage capacities 31014 is stored in the physical limitation value 31035 of the storage resource amount progress information 3103.

Next, the management information update program 3110 stores a logical limitation value input through an input device 370 in the logical limitation value 31036 of the storage resource amount progress information 3103.

Next, the management information update program 3110 selects all the records in which storage resource pool identification information 31039 of a record to update data coincides with the storage resource pool identification information 31082 of the virtual storage extent configuration management information 3108 from the virtual storage configuration management information 3108. Subsequently, storage subsystem identification information 31083 and storage extent identification information 31084 are extracted from the selected record.

Next, a record in which the extracted storage subsystem identification information 31083 coincides with the storage subsystem identification information 31011 of the storage extent configuration management information 3101, and the extracted storage extent identification information 31084 coincides with the storage extent identification information 31013 of the storage extent configuration management information 3101 is selected from the storage extent configuration management information 3101. Then, storage capacities 31014 are extracted from the selected record.

Next, a sum total of the extracted storage capacities 31014 is calculated. Then, the calculated sum total of the storage capacities 31014 is stored in the assigned capacity 31037 of the storage resource amount progress information 31013.

Thus, the management information update program 3110 updates the storage resource amount progress information 3103.

FIG. 27 shows a configuration of the virtual storage extent resource amount progress information 3105 of the management computer 300 according to the second embodiment of this invention.

The virtual storage extent resource amount progress information 3105 contains virtual storage extent identification information 31051 and storage resource configuration progress information 31053.

The virtual storage extent identification information 31051 is a unique identifier of a virtual storage extent 170.

The storage resource configuration progress information 31053 is a progress of various pieces of information regarding the virtual storage extent 170, and contains a physical limitation value 31055, a logical limitation value 31056, and a used capacity 31058.

The physical limitation value 31055 is a sum total of capacities of storage extents 120 assignable to the virtual storage extent 170. In other words, the physical limitation value 31055 is a physical limitation value of the used capacity of the virtual storage extent 170.

The logical limitation value 31056 is a logical limitation value of the used capacity of the virtual storage extent 170. The logical limitation value 31056 is a value set by the administrative user.

The used capacity 31058 a capacity of data actually stored in the virtual storage extent 170.

The management information update program 3110 updates the virtual storage extent resource amount progress information 3105 based on the storage extent configuration management information 3101 shown in FIG. 7, the storage resource pool management information 3106 shown in FIG. 10, and the virtual storage extent configuration management information 3108 shown in FIG. 25. For example, the management information update program 3110 adds information to the virtual storage extent resource amount progress information 3105 at a predetermined interval (e.g., once a month).

Specifically, the management information update program 3110 selects all the records in which virtual storage extent identification information 31051 of a record to update data coincides with the virtual storage extent identification information 31081 of the virtual storage extent configuration management information 3108 from the virtual storage extent configuration management information 3108. Next, storage resource pool identification information 31082 is extracted from the selected record.

Next, a record in which the extracted storage resource pool identification information 31082 coincides with the storage resource pool identification information 31061 of the storage resource pool management information 3106 is selected from the storage resource pool management information 3106. Next, storage subsystem identification information 31063 and storage extent identification information 31064 are extracted from the selected record.

Next, a record in which the extracted storage subsystem identification information 31063 coincides with the storage subsystem identification information 31011 of the storage extent configuration management information 3101, and the extracted storage extent identification information 31064 coincides with the storage extent identification information 31013 of the storage extent configuration management information 3101 is selected from the storage extent configuration management information 3101. Then, storage capacities 31014 are extracted from the selected record.

Next, a sum total of the extracted storage capacities 31014 is calculated. Then, the calculated sum total of the storage capacities 31014 is stored in the physical limitation value 31055 of the virtual storage extent resource amount progress information 3105.

Next, the management information update program 3110 stores a logical limitation value input from the input device 370 in the logical limitation value 31056 of the virtual storage extent resource amount progress information 3105.

Then, the management information update program 3110 obtains a used capacity of the virtual storage extent 170 corresponding to a record to update data from the storage subsystem 100. Subsequently, the obtained used capacity is stored in the used capacity 31058 of the virtual storage extent resource amount progress information 3105.

Thus, the management information update program 3110 updates the virtual storage extent resource amount progress information 3105.

Figure 28:
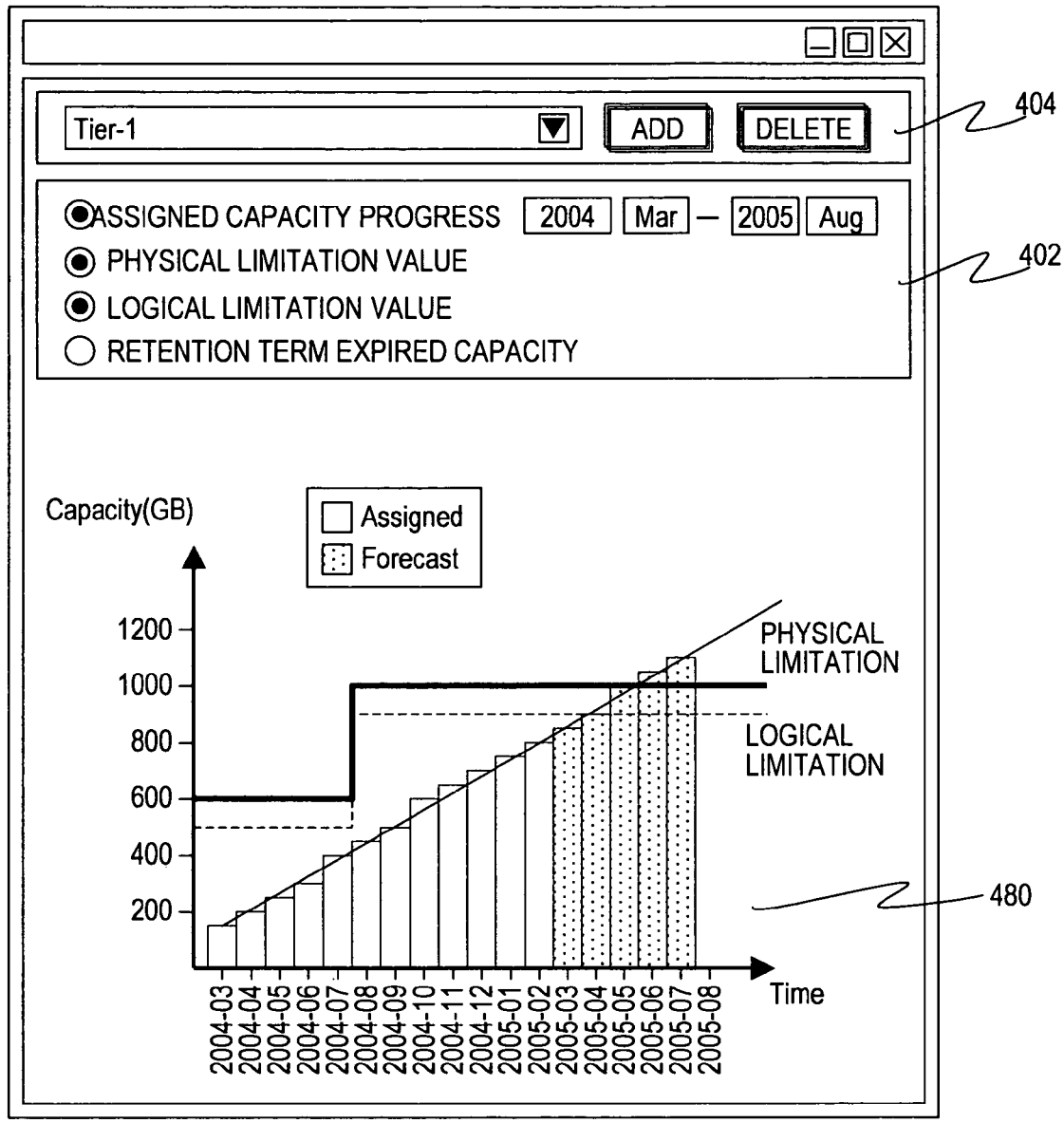
FIG. 28 is an explanatory diagram of a display screen of the management computer according to the second embodiment of this invention.

FIG. 28 is an explanatory diagram of a display screen of the management computer 300 according to the second embodiment of this invention.

The display screen of the management computer 300 includes a storage resource pool selection unit 404, a display content designation unit 402, and a graph 480.

In the storage resource pool selection unit 404, a storage resource pool is selected by the administrative user. The management computer 300 displays a graph regarding the resource storage pool selected in the storage resource pool selection unit 404.

In the display content designation unit 402, contents of a graph to be displayed are designated by the user. Specifically, in the display content designation unit 402, designation is made as to whether a graph regarding an assigned capacity, a physical limitation value, a logical limitation value, and a retention term expired capacity is displayed or not. In FIG. 28, switching is made between graph displaying and nondisplaying by a radio button of each item. Additionally, in the display content designation unit 402, a period of a graph regarding an assigned capacity is designated by the user.

Referring to FIG. 28, in the storage resource pool selection unit 404, a storage resource pool of "Tier-1" is selected.

In the display content designation unit 402, displaying of a graph regarding an assigned capacity, a physical limitation value, and a logical limitation value is designated. Additionally, in the display content designation unit 402, displaying of a graph regarding an assigned capacity from March of 2004 to August of 2005 is designated.

Then, the management computer 300 displays a graph 480.

Specifically, a record in which the "Tier-1" selected in the storage resource pool selection unit 404 coincides with storage resource pool identification information 31039 of the storage resource amount progress information 3103 is selected from the storage resource amount progress information 3103.

Next, information regarding contents designated in the display content designation unit 402 is extracted from the selected record. In this case, a physical limitation value 31035, a logical limitation value 31036, and an assigned capacity 31037 are extracted from the selected record.

Next, a future assigned capacity is forecast based on the extracted assigned capacity 31037. In this case, the future assigned capacity is forecast by using a forecast function. For example, the forecast function is a linear forecast function or the like.

Then, the physical limitation value 31035, the logical limitation value 31036, and the assigned capacity 31037 that have been extracted are displayed as a graph 480. Further, the forecast future assigned capacity is displayed as the graph 480.

In other words, the management computer 300 displays the graph 480 regarding the storage resource pool of "Tier-1". Accordingly, the administrative user can visually understand a situation of the storage resource pool.

Figure 29:
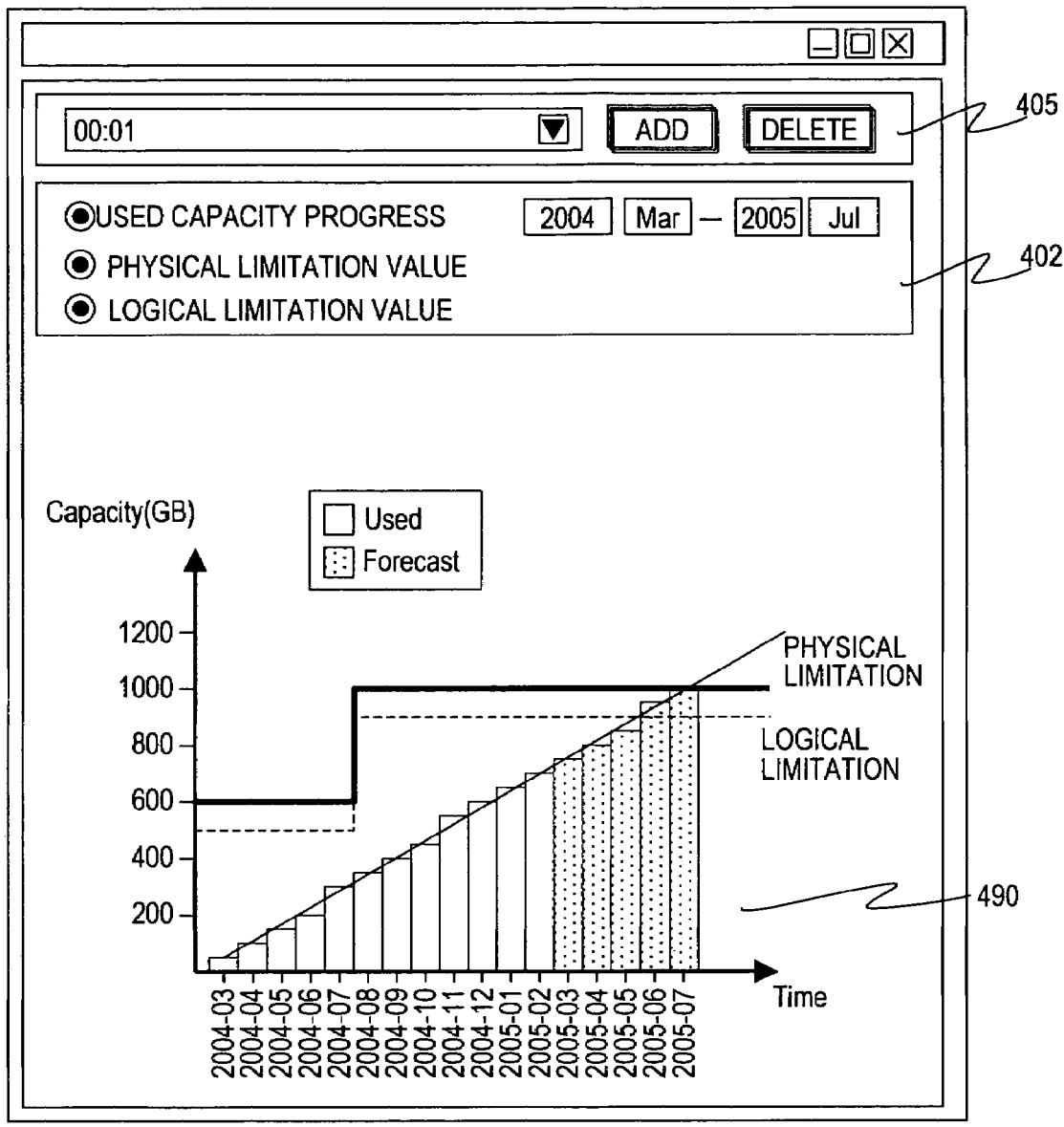
FIG. 29 is an explanatory diagram of the display screen of the management computer according to the second embodiment of this invention.

FIG. 29 is an explanatory diagram of the display screen of the management computer 300 according to the second embodiment of this invention.

The display screen of the management computer 300 includes a virtual storage extent selection unit 405, a display content designation unit 402, and a graph 480.

In the virtual storage extent selection unit 405, a virtual storage extent 405 is selected by the administrative user. The management computer 300 displays a graph regarding the virtual storage extent 170 selected in the virtual storage extent selection unit 405.

In the display content designation unit 402, contents of a graph to be displayed are designated by the user. Specifically, in the display contents designation unit 402, designation is made as to whether a graph regarding an assigned capacity, a physical limitation value, and a logical limitation value is displayed or not. As shown in FIG. 29, switching is made between graph displaying and nondisplaying by a radio button of each item. Additionally, in the display content designation unit 402, a period of a graph regarding the assigned capacity is designated by the user.

Referring to FIG. 29, in the virtual storage extent selection unit 405, a virtual storage extent 170 of "00:01" is selected.

In the display content designation unit 402, displaying of a graph regarding an assigned capacity, a physical limitation value, and a logical limitation value is designated. Further, in the display content designation unit 402, displaying of a graph regarding an assigned amount from March of 2004 to July of 2005 is designated.

Then, the management computer 300 displays a graph 490.

Specifically, a record in which "00:01" selected in the virtual storage extent selection unit 405 coincides with the virtual storage extent identification information 31051 of the virtual storage extent resource amount progress information 3105 is selected from the virtual storage extent resource amount progress information 3105.

Next, information regarding contents designated in the display content designation unit 402 is extracted from the selected record. In this case, a physical limitation value 31055, a logical limitation value 31056, and a used capacity 31058 are extracted from the selected record.

Next, a future used capacity is forecast based on the extracted used capacity 31058. In this case, the future used capacity is forecast by using a forecast function. For example, the forecast function is a linear forecast function or the like.

Then, the physical limitation value 31055, the logical limitation value 31056, and the used capacity 31058 are displayed as a graph 490. Further, the forecast future used capacity is displayed as the graph 490.

In other words, the management computer 300 displays the graph 490 regarding the virtual storage extent 170 of "00:01". Accordingly, the administrative user can visually understand a situation of the virtual storage extent 170.

In this case, the management computer 300 may add a new storage extent 120 to the virtual storage extent 170 according to a used capacity of the virtual storage extent 170.

Storage extent addition processing of the management computer 300 will be described below.

Figure 30:
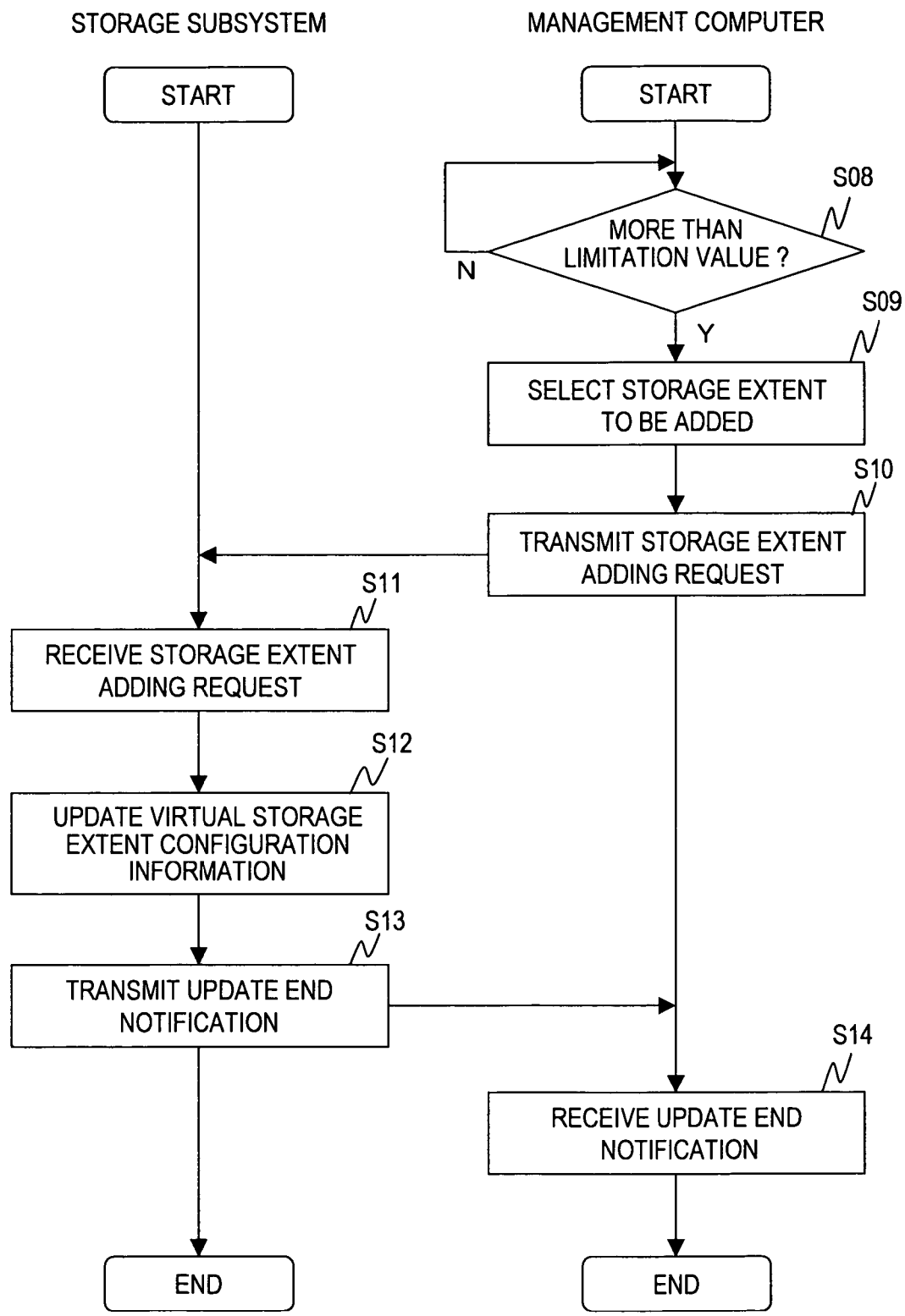
FIG. 30 is a flowchart of storage extent addition processing of the management computer according to the second embodiment of this invention.

FIG. 30 is a flowchart of storage extent addition processing of the management computer 300 according to the second embodiment of this invention.

First, the management computer 300 extracts the physical limitation value 31055, the logical limitation value 31056, and the used capacity 31058 from the virtual storage extent resource amount progress information 3105 at a predetermined interval. Next, a future used capacity is forecast based on the extracted used capacity 31058.

Subsequently, determination is made as to whether the forecast future capacity will exceed the physical limitation value 31055 and/or the logical limitation value 31056 or not (S08). In other words, determination is made as to whether the used capacity will exceed the physical limitation value 31055 and/or the logical limitation value 31056 or not in the near future (e.g., within three months or the like).

When it is determined that the future used capacity will not exceed the limitation value, the step S08 is repeated.

On the other hand, when it is determined that the future used capacity will exceed the limitation value, a storage extent 120 to be added to the virtual storage capacity 170 is selected (S09).

Specifically, a record in which an identifier of the virtual storage extent 170 coincides with the virtual storage extent identification information 11081 of the virtual storage extent configuration information 1108 is selected from the virtual storage extent configuration information 1108. Next, storage resource pool identification information 11082 is extracted from the selected record.

Next, a storage extent 120 unassigned to any one of the virtual storage extents 170 is retrieved from the storage resource pool corresponding to the extracted storage resource pool identification information 11082. Then, the retrieved storage extent 120 is selected as a storage extent 120 to be added to the virtual storage extent 170.

Next, a storage extent addition request is transmitted to the storage subsystem 100 which includes the selected storage extent 120 (S10). Storage extent addition information contains an identifier of the storage extent 120, an identifier of the virtual storage extent 170 to which the storage extent 120 is added, and an identifier of a storage resource pool to which the storage extent 120 belongs.

Then, the storage subsystem 100 receives the storage extent addition information from the management computer 300 (S11).

Next, the storage subsystem 100 updates the virtual storage extent configuration information 1108 based on the received storage extent addition information (S12).

Specifically, the identifier of the storage extent 120, the identifier of the virtual storage extent, and the identifier of the storage resource pool are extracted from the received storage extent addition information. Then, a record in which the extracted identifier of the virtual storage extent coincides with the virtual storage extent identification information 11081 of the virtual storage extent configuration information 1108 is selected from the virtual storage extent configuration information 1108.

Next, the extracted identifier of the storage resource pool is added to the storage resource pool identification information 11082 of the selected record. Further, the extracted identifier of the storage extent 120 is added to the storage extent identification information 11084 of the selected record.

Subsequently, an update end notification is sent to the management computer 300 (S13).

Then, the management computer 300 receives the update end notification from the storage subsystem 100. Accordingly, the storage extent addition processing is finished.

Thus, the management computer 300 can add the storage extent 120 to the virtual storage extent 170.

This invention can be used for a computer system which includes a storage subsystem to store various pieces of information. Especially, the invention can be used for a computer system which stores data obliged to be retained for a certain period by a law in a storage subsystem. For example, the invention can be used for a computer system which stores data of a financial or medical institution in a storage subsystem.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a storage subsystem, which has a first interface connected to a network, a first processor connected to the first interface, a first memory connected to the first processor, and a disk drive for storing data requested to be written from the host computer;
a host computer connected to the storage subsystem through the network, which has a second interface connected to the network, a second processor connected to the second interface, and a second memory connected to the second processor; and a management computer configured to access the storage subsystem and the host computer which has a third interface connected to the storage subsystem and the host computer, a third processor connected to the third interface, and a third memory connected to the third processor, wherein:

the second processor recognizes a storage extent of the disk drive by a storage extent unit;

the first processor creates storage extent configuration information containing a correspondence between the storage extent and a group to manage the storage extent by a group unit; and the third processor stores group management information to manage a data protection term for each group, obtains the storage extent configuration information created by the first processor via the third interface, calculates an assigned capacity which is a sum total of capacities of the storage extents assigned to each group based on the obtained storage extent configuration information, forecasts a capacity to be assigned in the future for each group based on the calculated assigned capacity, calculates a protection term expired capacity which is a sum total of capacities of the storage extents storing protection term expired data for each group based on the stored group management information and the obtained storage extent configuration information, and outputs the calculated assigned capacity, the forecast capacity to be assigned in the future, and the calculated protection term expired capacity.

2. The computer system according to claim 1, wherein the third processor time-sequentially outputs a progress of the calculated assigned capacity, a progress of the forecast capacity to be assigned in the future, and a progress of the calculated protection term expired capacity.

3. The computer system according to claim 1, wherein the second processor manages storage extents storing the same application host group data as the same group.

4. The computer system according to claim 1, wherein the third processor stores storage resource distribution management information to manage a limitation value of the assigned capacity of the storage extents for each group, determines whether at least one of the calculated assigned capacity of the storage extents and the forecast assigned capacity of the storage extents exceeds the limitation value or not for each group based on the stored storage resource distribution management information, and assigns the storage extent to a group which exceeds the limitation value when the assigned capacity of the storage extents exceeds the limitation value.

5. The computer system according to claim 1, wherein:

the second processor manages the storage extent by a storage resource pool unit;

the storage extent configuration information includes a correspondence between the storage extent and a storage resource pool; and the third processor calculates the assigned capacity of the storage resource pool unit for each group based on the obtained storage extent configuration information, forecasts a capacity to be assigned in the future of the storage resource pool unit for each group based on the calculated assigned capacity of the storage resource pool unit, and calculates the protection term expired capacity of the storage resource pool unit for each group based on the stored group management information and the obtained storage extent configuration information.

6. The computer system according to claim 1, wherein upon reception of a changing request of a protection term of the data, the third processor outputs the calculated protection term expired capacity in a position corresponding to a period of changing the protection term.

7. A management computer, which is connected to at least one of a storage subsystem which comprises a disk drive for storing write data from a host computer, and the host computer connected to the storage subsystem through a network and capable of recognizing a storage extent of the disk drive by a storage extent unit, comprising:

an interface connected to at least one of a storage subsystem and the host computer;

a processor connected to the interface; and a memory connected to the processor, wherein the processor:

stores storage extent configuration information including a correspondence between the storage extent and a group to manage the storage extent of the storage subsystem by a group unit, and group management information for managing a data protection term for each group, in the memory;

calculates, for each group, an assigned capacity which is a sum total of capacities of the storage extents assigned to the groups based on the stored storage extent configuration information;

forecasts a capacity to be assigned in the future for each group based on the calculated assigned capacity;

calculates a protection term expired capacity which is a sum total of capacities of the storage extents storing protection term expired data for each group based on the stored group management information and the stored storage extent configuration information; and outputs the calculated assigned capacity, the forecast capacity to be assigned in the future, and the calculated protection term expired capacity.

8. The management computer according to claim 7, wherein the processor time-sequentially outputs a progress of the calculated assigned capacity, a progress of the forecast capacity to be assigned in the future, and a progress of the calculated protection term expired capacity.

9. The management computer according to claim 7, wherein the processor manages storage extents storing the same application host group data as the same group.

10. The management computer according to claim 7, wherein the processor:

stores storage resource distribution management information to manage a limitation value of the assigned capacity of the storage extents for each group;

determines whether at least one of the calculated assigned capacity of the storage extents and the forecast assigned capacity of the storage extents exceeds the limitation value or not for each group based on the stored storage resource distribution management information; and assigns the storage extent to a group which exceeds the limitation value when the assigned capacity of the storage extents exceeds the limitation value.

11. The management computer according to claim 7, wherein the processor:

manages the storage extent by a storage resource pool unit, stores storage extent configuration information including a correspondence between the storage extent and a storage resource pool and a correspondence between the storage extent and the group, calculates the assigned capacity of the storage resource pool unit for each group based on the stored storage extent configuration information, forecasts a capacity to be assigned in the future of the storage resource pool unit for each group based on the calculated assigned capacity of the storage resource pool unit, and calculates the protection term expired capacity of the storage resource pool unit for each group based on the stored group management information and the stored storage extent configuration information.

12. The management computer according to claim 7, wherein upon reception of a changing request of a protection term of the data, the processor outputs the calculated protection term expired capacity in a position corresponding to a period of changing the protection term.

13. A method of managing a storage extent in a computer system which comprises a storage subsystem for storing data in a storage extent, a host computer to store data in the storage extent of the storage subsystem, and a management computer for managing the storage subsystem and the host computer, the method comprising:

storing, by the storage subsystem, storage extent configuration information including a correspondence between the storage extent and a group to manage the storage extent of the storage subsystem by a group unit;

storing, by the management computer, group management information for managing a data protection term for each a group;

obtaining, by the management computer, the storage extent configuration information created by the storage subsystem;

calculating, by the management computer, an assigned capacity which is a sum total of capacities of the storage extents assigned to the groups for each group based on the obtained storage extent configuration information;

forecasting, by the management computer, a capacity to be assigned in the future for each group based on the calculated assigned capacity;

calculating, by the management computer, a protection term expired capacity which is a sum total of capacities of the storage extents storing protection term expired data for each group based on the stored group management information and the obtained storage extent configuration information; and outputting, by the management computer, the calculated assigned capacity, the forecast capacity to be assigned in the future, and the calculated protection term expired capacity.

14. The method of managing a storage extent according to claim 13, further comprising time-sequentially outputting, by the management computer, a progress of the calculated assigned capacity, a progress of the forecast capacity to be assigned in the future, and a progress of the calculated protection term expired capacity.

15. The method of managing a storage extent according to claim 13, further comprising managing, by the storage subsystem, storage extents storing the same application host group data as the same group.

16. The method of managing a storage extent according to claim 13, further comprising:

storing, by the management computer, storage resource distribution management information to manage a limitation value of the assigned capacity of the storage extents for each group;

determining, by the management computer, whether at least one of the calculated assigned capacity of the storage extents and the forecast assigned capacity of the storage extents exceeds the limitation value or not for each group based on the stored storage resource distribution management information; and assigning, by the management computer, the storage extent to a group which exceeds the limitation value when the assigned capacity of the storage extents exceeds the limitation value.

17. The method of managing a storage extent according to claim 13, wherein the storage extent configuration information including a correspondence between the storage extent and a storage resource pool, the method further comprising:

managing, by the storage subsystem, the storage extent by a storage resource pool unit, and calculating, by the management computer, the assigned capacity of the storage resource pool unit for each group based on the obtained storage extent configuration information, forecasting, by the management computer, a capacity to be assigned in the future of the storage resource pool unit for each group based on the calculated assigned capacity of the storage resource pool unit, and calculating, by the management computer, the protection term expired capacity of the storage resource pool unit for each group based on the stored group management information and the obtained storage extent configuration information.

18. The method of managing a storage extent according to claim 13, further comprising, upon reception of a changing request of a protection term of the data, outputting, by the third processor, the calculated protection term expired capacity in a position corresponding to a period of changing the protection term.

* * * * *